United States Patent
Sakaue et al.

(10) Patent No.: US 10,461,591 B2
(45) Date of Patent: Oct. 29, 2019

(54) ROTARY ELECTRIC MACHINE WITH ARMATURE COIL END TOP PORTIONS DISPLACED IN A RADIAL DIRECTION

(71) Applicants: Atsushi Sakaue, Chiyoda-ku (JP);
Hiroyuki Akita, Chiyoda-ku (JP);
Hironori Tsuiki, Chiyoda-ku (JP);
Masaya Inoue, Chiyoda-ku (JP)

(72) Inventors: Atsushi Sakaue, Chiyoda-ku (JP);
Hiroyuki Akita, Chiyoda-ku (JP);
Hironori Tsuiki, Chiyoda-ku (JP);
Masaya Inoue, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 962 days.

(21) Appl. No.: 14/407,218

(22) PCT Filed: Feb. 25, 2013

(86) PCT No.: PCT/JP2013/054807
§ 371 (c)(1),
(2) Date: Dec. 11, 2014

(87) PCT Pub. No.: WO2014/006927
PCT Pub. Date: Jan. 9, 2014

(65) Prior Publication Data
US 2015/0162787 A1    Jun. 11, 2015

(30) Foreign Application Priority Data

Jul. 6, 2012 (JP) .................................. 2012-152686

(51) Int. Cl.
*H02K 3/12* (2006.01)
*H02K 1/16* (2006.01)
(Continued)

(52) U.S. Cl.
CPC ............... *H02K 1/16* (2013.01); *H02K 1/148* (2013.01); *H02K 3/12* (2013.01); *H02K 3/28* (2013.01);
(Continued)

(58) Field of Classification Search
CPC ...... H02K 15/085; H02K 15/08; H02K 15/04; H02K 15/045; H02K 1/00–16;
(Continued)

(56) References Cited

U.S. PATENT DOCUMENTS 3,079,519 A * 2/1963 Kitson, Jr. ............... H02K 3/34
156/185
5,619,787 A * 4/1997 Couture ................... H02K 3/12
29/596

(Continued)

FOREIGN PATENT DOCUMENTS

JP    2001-251819 A    9/2001
JP    3438570 B2       8/2003
(Continued)

OTHER PUBLICATIONS

International Search Report (PCT/ISA/210) dated Apr. 23, 2013, by the Japanese Patent Office as the International Searching Authority for International Application No. PCT/JP2013/054807.
(Continued)

*Primary Examiner* — Mang Tin Bik Lian
*Assistant Examiner* — Maged M Almawri
(74) *Attorney, Agent, or Firm* — Buchanan Ingersoll & Rooney PC

(57) ABSTRACT

A stator winding is formed by mounting winding bodies individually into pairs of slots of a stator core separated by a predetermined number of slots, the winding bodies each being formed by winding a jointless, continuous conductor wire coated with insulation for m turns into a helical shape
(Continued)

such that end portions of rectilinear portions are linked by coil ends, where m is a natural number that is greater than or equal to two, and the coil ends include a top portion that displaces by a predetermined amount in a radial direction at an approximately central portion between the linked rectilinear portions, the radial displacement at the top portions is approximately a×d, where a is a natural number that is greater than or equal to 1 and less than or equal to (m−1), and d is a radial thickness of the rectilinear portions.

7 Claims, 22 Drawing Sheets

(51) Int. Cl.
  H02K 1/14 (2006.01)
  H02K 3/28 (2006.01)
  H02K 15/04 (2006.01)
  H02K 15/085 (2006.01)
(52) U.S. Cl.
  CPC ........... *H02K 15/04* (2013.01); *H02K 15/045* (2013.01); *H02K 15/085* (2013.01); *Y10T 29/49009* (2015.01)
(58) Field of Classification Search
  CPC .......... H02K 1/165; H02K 1/148; H02K 3/00; H02K 3/12; H02K 3/14; H02K 3/28; H02K 2213/00; H02K 2213/03
  USPC .................. 310/179–208; 29/606, 605, 29/603.23–603.26
  See application file for complete search history.

(56) References Cited

U.S. PATENT DOCUMENTS

| | | | | |
|---|---|---|---|---|
| 5,955,810 A * | 9/1999 | Umeda | ................ | H02K 1/165 310/201 |
| 6,140,735 A * | 10/2000 | Kato | ................ | H02K 1/16 310/201 |
| 7,386,931 B2 * | 6/2008 | Neet | ................ | H02K 15/0478 29/596 |
| 7,825,562 B2 * | 11/2010 | Naganawa | ............ | H02K 15/063 310/184 |
| 7,923,884 B2 * | 4/2011 | Seguchi | ................ | H02K 3/12 310/180 |
| 8,008,830 B2 * | 8/2011 | Kouda | ................ | H02K 3/12 310/201 |
| 8,018,112 B2 * | 9/2011 | Dobashi | ............. | H02K 15/0037 310/179 |
| 8,093,777 B2 * | 1/2012 | Stiesdal | ................ | H02K 3/12 310/198 |
| 8,183,734 B2 * | 5/2012 | Saban | ................ | H02K 1/02 310/179 |
| 8,193,675 B2 * | 6/2012 | Ishizuka | ................ | H02K 3/12 310/201 |
| 8,427,024 B2 * | 4/2013 | Watanabe | ................ | H02K 3/12 310/179 |
| 8,779,643 B2 * | 7/2014 | Umeda | ................ | H02K 3/28 310/184 |
| 2005/0073208 A1 * | 4/2005 | Mitcham | ................ | H02K 3/14 310/184 |
| 2009/0260217 A1 * | 10/2009 | Kamakura | ............... | H02K 3/12 29/596 |
| 2010/0141078 A1 * | 6/2010 | Kouda | ................ | H02K 3/12 310/195 |
| 2010/0148621 A1 * | 6/2010 | Ishizuka | ................ | H02K 3/12 310/201 |
| 2012/0025658 A1 * | 2/2012 | Watanabe | ................ | H02K 3/12 310/179 |
| 2012/0200191 A1 * | 8/2012 | Baba | ................ | H02K 3/12 310/201 |

FOREIGN PATENT DOCUMENTS

| | | |
|---|---|---|
| JP | 2005-521372 A | 7/2005 |
| JP | 2008-104293 A | 5/2008 |
| JP | 2009-112186 A | 5/2009 |
| WO | WO 03/081749 A1 | 10/2003 |
| WO | WO 2011/074114 A1 | 6/2011 |

OTHER PUBLICATIONS

Written Opinion (PCT/ISA/237) dated Apr. 23, 2013, by the Japanese Patent Office as the International Searching Authority for International Application No. PCT/JP2013/054807.

\* cited by examiner ial direction, and that the length of the conductor wires is
ROTARY ELECTRIC MACHINE WITH ARMATURE COIL END TOP PORTIONS DISPLACED IN A RADIAL DIRECTION

TECHNICAL FIELD

The present invention relates to a rotary electric machine such as an electric motor or a generator, for example, and to a manufacturing method therefor, and particularly relates to an armature winding construction and a manufacturing method therefor.

BACKGROUND ART

In recent years, compactness, high output, and high quality have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. However, stators that use stator windings of distributed winding construction that can suppress torque pulsation and increase output are in demand. In addition, demand for induction machines that do not use magnets has also increased due to steep rises in magnet prices, and there is demand for stators that use higher-efficiency distributed winding stator windings.

Here, in contrast to concentrated windings, which are configured by winding conductor wires onto individual teeth, windings that are configured by winding conductor wires into slots that are separated by greater than or equal to two slots are designated "distributed windings". In other words, distributed windings are wound such that a conductor wire that extends outward from one slot spans two or more consecutive teeth and enters another slot.

In conventional rotary electric machines such as that described in Patent Literature 1, winding coils that are formed into a coil shape by winding a rectangular conductor wire a plurality of times, also known as "hexagonal coils", are housed in respective pairs of slots that are separated by a predetermined number of slots to constitute a distributed winding stator winding.

In conventional rotary electric machines such as that described in Patent Literature 2, winding assemblies that are produced by simultaneously bending and folding conductor wire groups that are formed by arranging a predetermined number of conductor wires at a pitch of one slot are mounted into a rectangular parallelepiped core, and that core is subsequently rolled into an annular shape to constitute a distributed winding stator winding.

In addition, in conventional rotary electric machines such as that described in Patent Literature 3, a plurality of U-shaped conductor segments are inserted from a first axial end of a stator core into pairs of slots that are separated by a predetermined number of slots, and end portions of the conductor segments that extend outward from a second axial end of the stator core are joined together by welding to constitute a distributed winding stator winding.

CITATION LIST

Patent Literature

[Patent Literature 1] Japanese Patent Laid-Open No. 2008-104293 (Gazette)

[Patent Literature 2] Japanese Patent Laid-Open No. 2001-251819 (Gazette)

[Patent Literature 3] Japanese Patent No. 3438570 (Gazette)

SUMMARY OF THE INVENTION

Problem to be Solved by the Invention

In conventional distributed winding stator windings such as that described in Patent Literature 1, because insertion of the hexagonal coils into bottom portions of a first slot and opening portions of a second slot in the pairs of slots that are separated by a predetermined number of slots is implemented by forming vertex portions at two ends of the hexagonal coils into crank shapes in which only width dimensions in a direction of alignment of conductor wires that constitute the hexagonal coils are offset, some problems have been that the coil ends are larger, making downsizing unachievable, and that the length of the conductor wires is increased, increasing winding resistance.

In conventional distributed winding stator windings such as that described in Patent Literature 2, because the winding assemblies are assemblies of wave windings, and are housed in all of the slots of the stator core, one problem has been that the length of each of the conductor wires is increased, and manufacturing apparatuses for the winding assemblies are massive, making reductions in price unachievable.

In conventional distributed winding stator windings such as that described in Patent Literature 3, because the stator winding is produced by welding together end portions of the U-shaped conductor segments that are inserted into respective pairs of slots of the stator core that are separated by a predetermined number of slots, one problem has been that the number of welds is a great, making the welding process complicated. In addition, it is necessary to perform insulating treatment among the weld portions between the end portions of the conductor segments, and another problem has been that the insulating treatment processes become complicated.

The present invention aims to solve the above problems and an object of the present invention is to provide a rotary electric machine and a manufacturing method therefor that enables reductions in resistance, downsizing, and cost reductions in an armature winding by using winding bodies that are configured by winding conductor wires into a helical shape to make an amount of radial displacement at top portions of coil ends of the winding bodies less than the total radial thickness of the conductor wires that are housed inside slots, thereby downsizing coil ends, reducing the number of welds, and shortening lengths of the conductor wires that constitute the winding bodies.

Means for Solving the Problem

In order to achieve the above object, according to one aspect of the present invention, there is provided a rotary electric machine including an armature that is formed by mounting an armature core to an annular armature winding, wherein the armature winding is formed by mounting winding bodies individually into pairs of slots of the armature core that are separated by a predetermined number of slots, the winding bodies each being formed by winding a jointless, continuous conductor wire that is coated with insulation for m turns into a helical shape such that end portions of rectilinear portions are linked by coil ends, where m is a natural number that is greater than or equal to two. The coil ends include a top portion that displaces by a predetermined amount in a radial direction at an approximately central portion between the linked rectilinear portions, the radial displacement at the top portions is approximately a×d, where a is a natural number that is greater than or equal to 1 and less than or equal to (m−1), and d is a radial thickness of the rectilinear portions that are housed inside the slots, 2m of the conductor wires of different pairs of the winding bodies are housed inside the slots so as to be stacked in a radial direction, and the armature core includes core blocks that are divided circumferentially, each of the core blocks including: a circular arc-shaped core back portion; and a tooth that is disposed so as to extend radially from the core back portion.

Effects of the Invention

According to the present invention, an armature winding is configured using winding bodies that are each configured by winding a jointless, continuous conductor wire into a helical shape for m turns. Thus, because the number of welds is significantly reduced compared to when an armature winding is configured using U-shaped conductor segments, welding processes and also insulating treatment processes among the weld portions can be simplified, and cost reductions can be achieved. Because the winding bodies have a dimension of approximately one pole, the length of the conductor wires is short, reducing the scale of manufacturing apparatus, and enabling reductions in price to be achieved, and reductions in conductor wiring resistance can also be achieved. In addition, because the amount of radial displacement at top portions of coil ends in the winding bodies is smaller than a radial thickness of the portions that are housed inside the slots, radial and axial dimensions of the coil end groups can be reduced, enabling downsizing to be achieved.

DESCRIPTION OF EMBODIMENTS

Preferred embodiments of a rotary electric machine and a manufacturing method therefor according to the present invention will now be explained with reference to the drawings.

Embodiment 1

Figure 1:
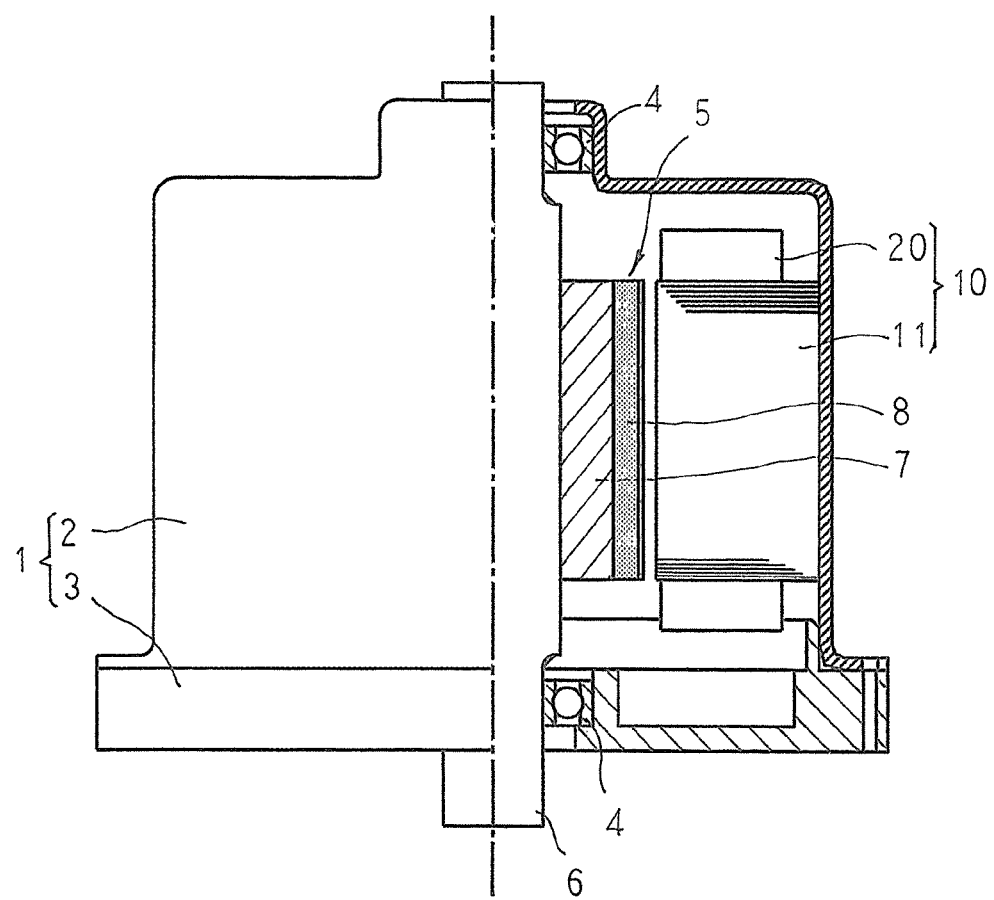
FIG. 1 is a half section that shows a rotary electric machine according to Embodiment 1 of the present invention.
Figure 2:
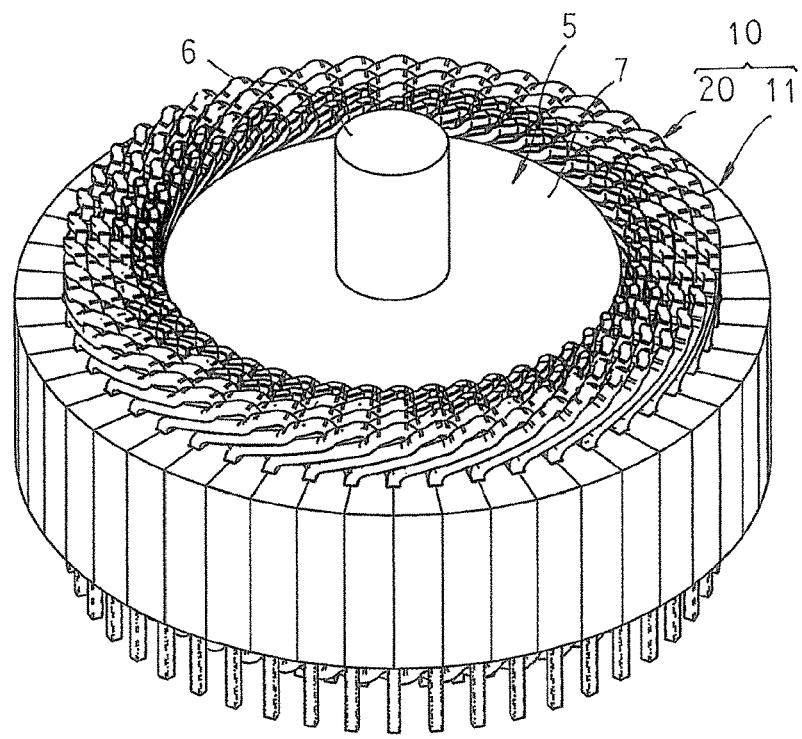
FIG. 2 is an oblique projection that shows part of the rotary electric machine according to Embodiment 1 of the present invention.
Figure 3:
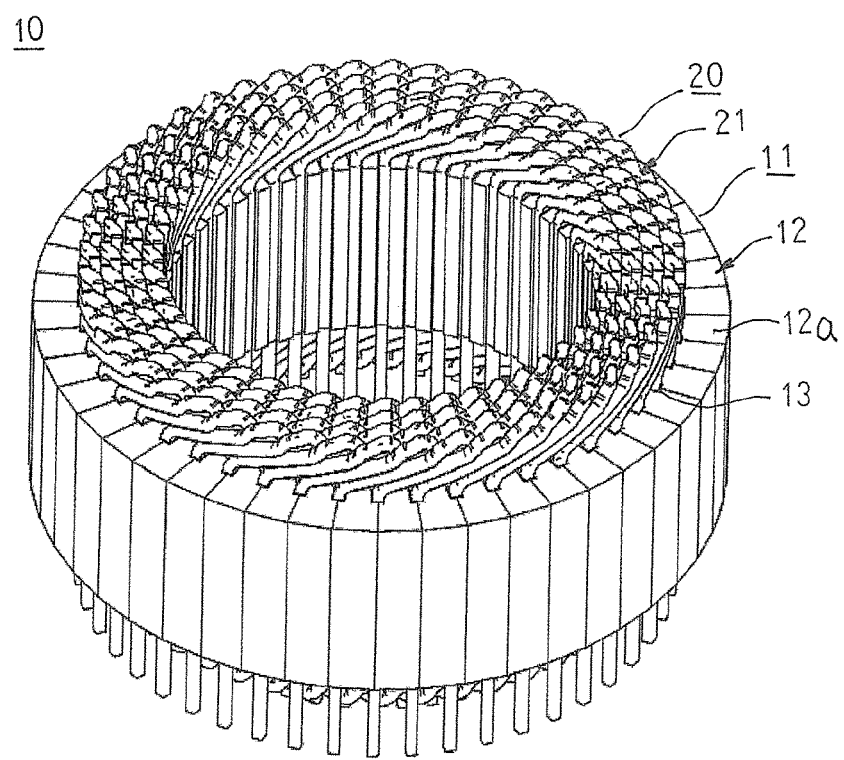
FIG. 3 is an oblique projection that shows a stator that is used in the rotary electric machine according to Embodiment 1 of the present invention.
Figure 4:
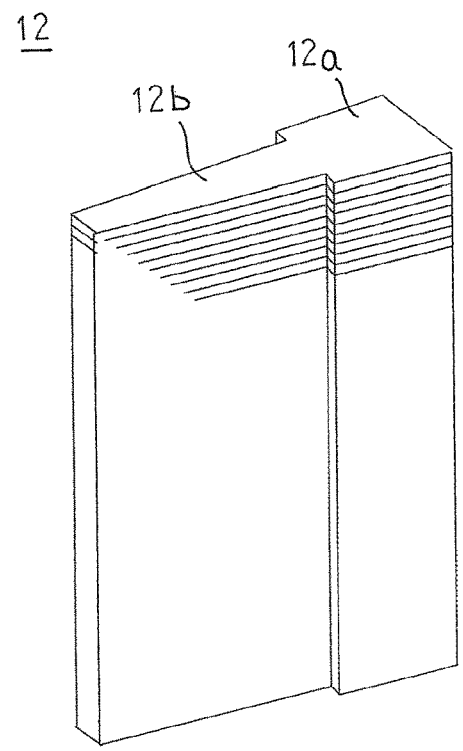
FIG. 4 is an oblique projection that shows a core block that constitutes a stator core that is used in the rotary electric machine according to Embodiment 1 of the present invention.
Figure 5:
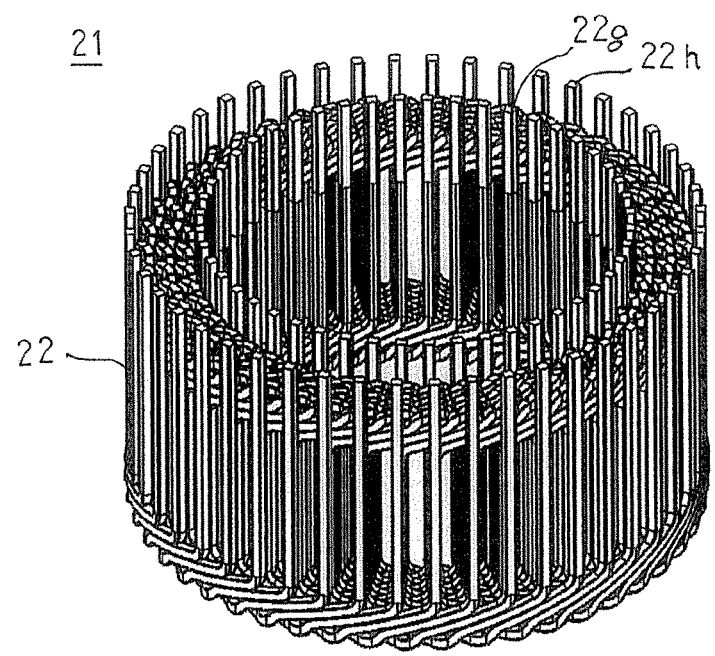
FIG. 5 is an oblique projection that shows a winding assembly that constitutes a stator winding of the stator that is used in the rotary electric machine according to Embodiment 1 of the present invention.
Figure 6:
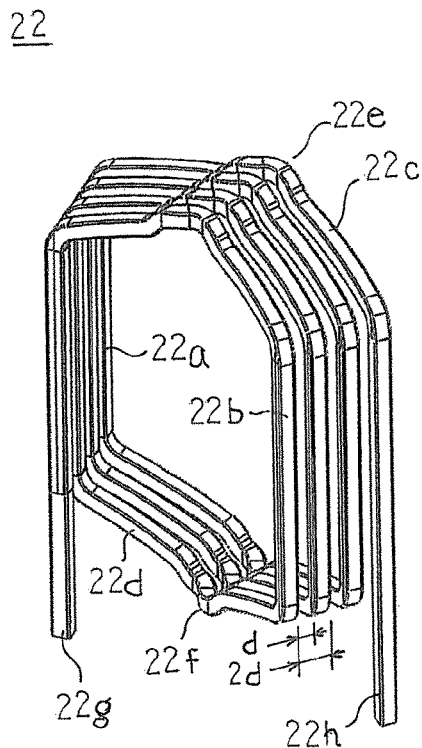
FIG. 6 is an oblique projection that shows a winding body that constitutes the winding assembly in the rotary electric machine according to Embodiment 1 of the present invention.
Figure 7:
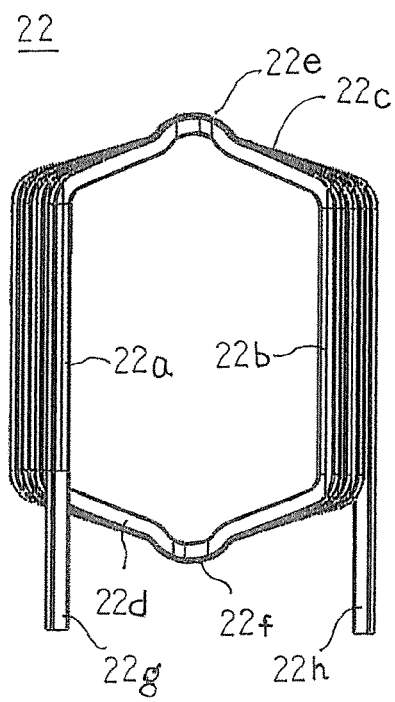
FIG. 7 is a front elevation that shows the winding body that constitutes the winding assembly in the rotary electric machine according to Embodiment 1 of the present invention.
Figure 8:
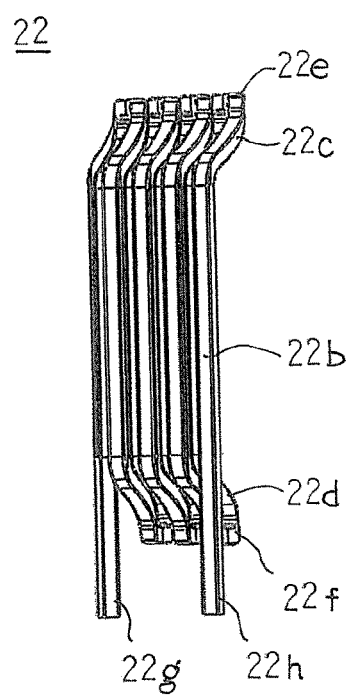
FIG. 8 is a side elevation that shows the winding body that constitutes the winding assembly in the rotary electric machine according to Embodiment 1 of the present invention.
Figure 9:
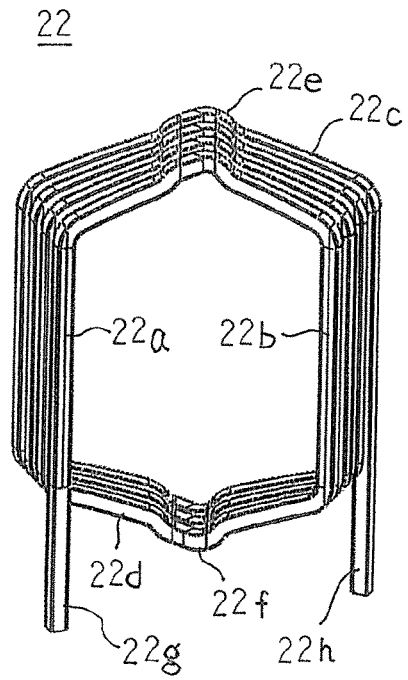
FIG. 9 is an oblique projection of the winding body that constitutes the winding assembly in the rotary electric machine according to Embodiment 1 of the present invention when viewed from obliquely above a front surface.
Figure 10:
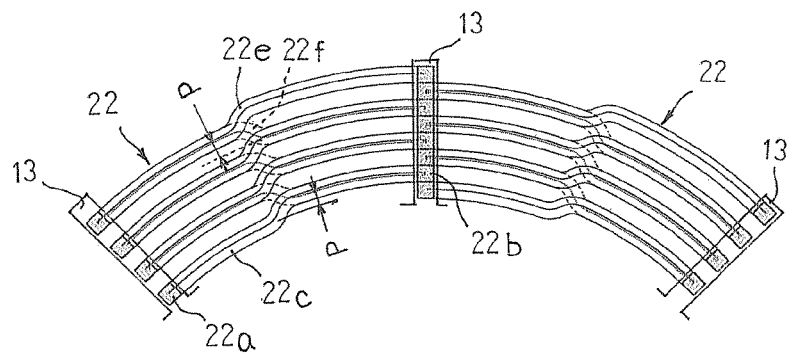
FIG. 10 is a partial end elevation of a state in which two winding bodies in the rotary electric machine according to Embodiment 1 of the present invention are mounted into the stator core so as to share a single slot when viewed from a side near a first axial end.
Figure 11:
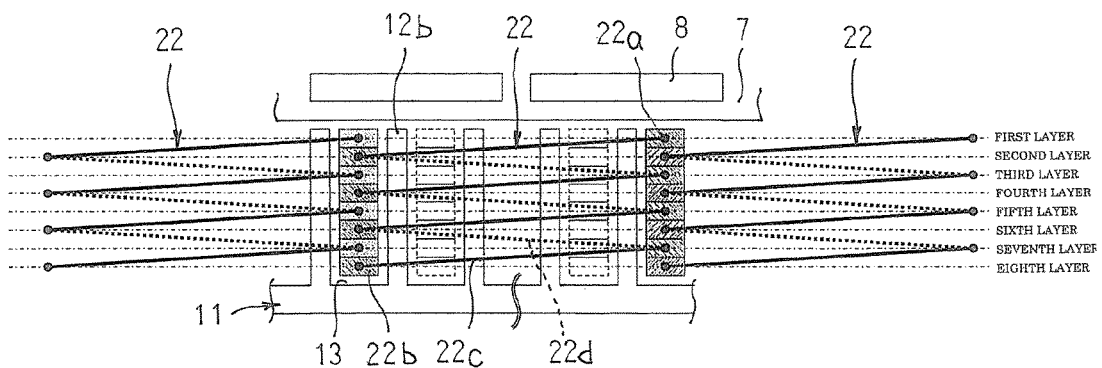
FIG. 11 is a developed projection of a state in which three winding bodies in the rotary electric machine according to Embodiment 1 of the present invention are mounted into identical slot groups of the stator core consecutively in a circumferential direction when viewed from a side near a first axial end.
Figure 12:
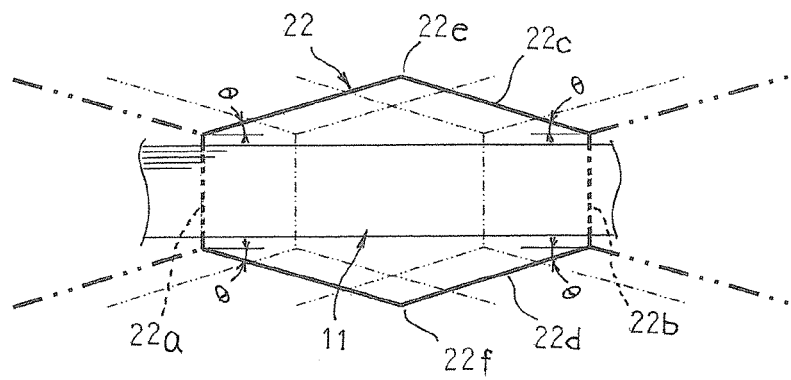
FIG. 12 is a developed projection that shows a state in which three winding bodies in the rotary electric machine according to Embodiment 1 of the present invention are mounted into identical slot groups of the stator core consecutively in a circumferential direction when viewed from radially outside.
Figure 13:
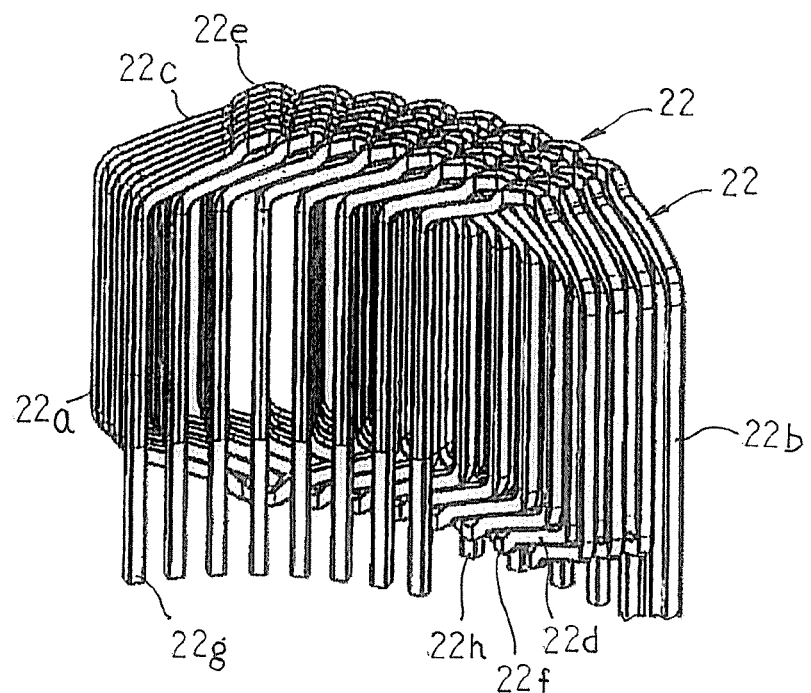
FIG. 13 is an oblique projection that shows a state in which eight winding bodies are arranged at a pitch of one slot in the circumferential direction in the rotary electric machine according to Embodiment 1 of the present invention.
Figure 14:
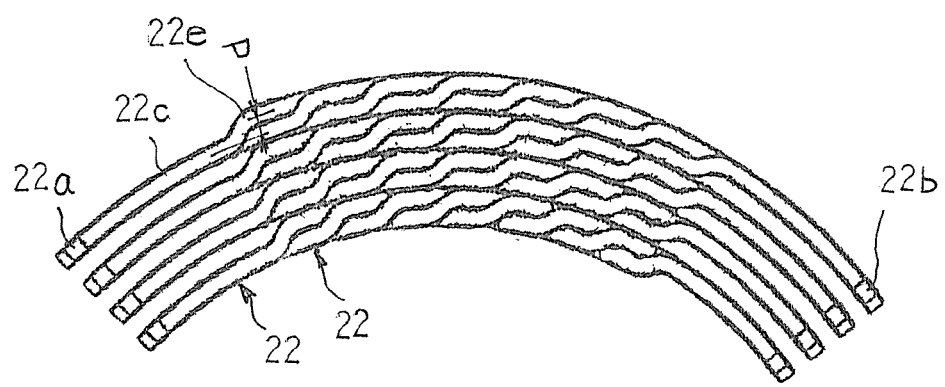
FIG. 14 is an end elevation of the state in which eight winding bodies are arranged at a pitch of one slot in the circumferential direction in the rotary electric machine according to Embodiment 1 of the present invention when viewed from a side near a first axial end.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes a stator core that is used in the rotary electric machine according to Embodiment 1 of the present invention, FIG. 5 is an oblique projection that shows a winding assembly that constitutes a stator winding of the stator that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, FIG. 9 is an oblique projection of the winding body that constitutes the winding assembly in the rotary electric machine according to Embodiment 1 of the present invention when viewed from obliquely above a front surface, FIG. 10 is a partial end elevation of a state in which two winding bodies in the rotary electric machine according to Embodiment 1 of the present invention are mounted into the stator core so as to share a single slot when viewed from a side near a first axial end, FIG. 11 is a developed projection of a state in which three winding bodies in the rotary electric machine according to Embodiment 1 of the present invention are mounted into identical slot groups of the stator core consecutively in a circumferential direction when viewed from a side near a first axial end, FIG. 12 is a developed projection that shows a state in which three winding bodies in the rotary electric machine according to Embodiment 1 of the present invention are mounted into identical slot groups of the stator core consecutively in a circumferential direction when viewed from radially outside, FIG. 13 is an oblique projection that shows a state in which eight winding bodies are arranged at a pitch of one slot in the circumferential direction in the rotary electric machine according to Embodiment 1 of the present invention, and FIG. 14 is an end elevation of the state in which eight winding bodies are arranged at a pitch of one slot in the circumferential direction in the rotary electric machine according to Embodiment 1 of the present invention when viewed from a side near a first axial end. Moreover, in FIG. 11, coil ends are represented as straight lines for simplicity.

In FIGS. 1 and 2, a rotary electric machine 100 includes: a housing 1 that has: a floored cylindrical frame 2; and an end plate 3 that closes an opening of the frame 2; a stator 10 that functions as an armature that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a predetermined pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 13.

As shown in FIG. 3, the stator 10 includes: a stator core 11 that functions as an armature core; and a stator winding 20 that functions as an armature winding 20 that is mounted onto the stator core 11. Here, to facilitate explanation, the number of poles in the rotor 5 is eight, the number of slots in the stator core 11 is forty-eight, and the stator winding 20 is a three-phase winding. In other words, the slots are formed on the stator core 11 at a ratio of two slots per phase per pole.

As shown in FIG. 4, core blocks 12 are made by dividing the annular stator core 11 into forty-eight equal sections circumferentially, and include: a core back portion 12a that has a circular arc-shaped cross section, that is produced by laminating and integrating a predetermined number of electromagnetic steel sheets; and a tooth 12b that is disposed so as to extend radially inward from an inner circumferential wall surface of the core back portion 12a. The stator core 11 is configured into an annular shape by arranging and integrating forty-eight core blocks 12 circumferentially by abutting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is rectangular.

As shown in FIG. 3, the stator winding 20 is configured by applying a predetermined connection process to the winding assembly 21 that is mounted onto the stator core 11. As shown in FIG. 5, the winding assembly 21 is configured by arranging winding bodies 22 that are housed in pairs of slots 13 that span six consecutive teeth 12b circumferentially at a pitch of one slot. Winding ends 22g (described below) each project axially outward, and are arranged on a radially inner side of the winding assembly 21 at a pitch of one slot circumferentially, and winding ends 22h (described below) each project axially outward, and are arranged on a radially outer side of the winding assembly 21 at a pitch of one slot circumferentially. The predetermined connection process is applied to the winding ends 22g and 22h of the winding assembly 21.

As shown in FIGS. 6 through 9, the winding bodies 22 are hexagonal coils that are configured by winding conductor wire that has a rectangular cross section that is made of unjointed continuous copper wire or aluminum wire that is insulated using an enamel resin, for example, for four turns helically into an approximate hexagon shape such that flat surfaces that are constituted by long sides of the rectangular cross sections face each other, and such that a gap d that is approximately equal to a length of short sides of the rectangular cross section is ensured between the facing flat surfaces in question. The winding bodies 22 are produced by winding the conductor wire for four turns helically into an edgewise winding to produce a tubular coil body, and subsequently forming the coil body into an approximate hexagon shape using a coil molding machine, for example. Alternatively, the winding bodies 22 may be produced by a folding and bending process, by bending conductor wire into an approximate hexagon shape while winding it helically.

The winding bodies 22 that are configured in this manner include: first and second rectilinear portions 22a and 22b that form two columns that are separated by an angular pitch of six slots in which four of each are arranged in a direction of short sides of the rectangular cross sections so as to leave gaps d in each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of six consecutive teeth 12b.

The first coil ends 22c extend outward at a predetermined inclination longitudinally outward relative to the first and second rectilinear portions 22a and 22b from first ends of first rectilinear portions 22a in a first column toward second rectilinear portions 22b in a second column, are bent approximately at right angles at central portions (first top portions 22e) between the columns of the first and second rectilinear portions 22a and 22b and displaced by a distance d in a direction of arrangement of the first and second rectilinear portions 22a and 22b, and are subsequently bent approximately at right angles and extend longitudinally inward relative to the first and second rectilinear portions 22a and 22b toward the second rectilinear portions 22b in the second column at a predetermined inclination, and are connected to first ends of the second rectilinear portion 22b in the second column.

Similarly, the second coil ends 22d extend outward at a predetermined inclination longitudinally outward relative to the first and second rectilinear portions 22a and 22b from second ends of second rectilinear portions 22b in the second column toward first rectilinear portions 22a in the first column, are bent approximately at right angles at central portions (second top portions 22f) between the columns of the first and second rectilinear portions 22a and 22b and displaced by a distance d in a direction of arrangement of the first and second rectilinear portions 22a and 22b, and are subsequently bent approximately at right angles and extend longitudinally inward relative to the first and second rectilinear portions 22a and 22b toward the first rectilinear portions 22a in the first column at a predetermined inclination, and are connected to second ends of the first rectilinear portions 22a in the first column.

In winding bodies 22 that are configured in this manner, the first and second rectilinear portions 22a and 22b, and the first and second coil ends 22c and 22d, are each arranged in the direction of the short sides of the rectangular cross sections of the conductor wire at a pitch (2d) that is approximately twice the length of the short sides such that flat surfaces that are constituted by the long sides of the rectangular cross sections of the conductor wire face each other. The first rectilinear portions 22a and the second rectilinear portions 22b that are connected to the first top portions 22e and the second top portions 22f are offset in the direction of arrangement by a distance d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column.

FIG. 10 shows a state in which two winding bodies 22 are respectively mounted into two consecutive pairs among pairs of slots 13 that span six consecutive teeth 12b, and FIGS. 11 and 12 show a state in which three winding bodies 22 are respectively mounted into two consecutive pairs among pairs of slots 13 that span six consecutive teeth 12b. Now, if focus is placed on a single winding body 22, a first coil end 22c that extends outward at the first axial end from a first rectilinear portion 22a in a first layer from a slot opening side of a first slot 13 extends toward a second slot 13 circumferentially at an angle of inclination θ, is shifted radially outward at a first top portion 22e by a distance d, subsequently extends toward the second slot 13 circumferentially at a reverse angle of inclination θ, and is linked to a second rectilinear portion 22b in a second layer from the slot opening side of the second slot 13. Next, a second coil end 22d that extends outward at the second axial end from the second rectilinear portion 22b in the second layer from the slot opening side of the second slot 13 extends toward the first slot 13 circumferentially at an angle of inclination θ, is shifted radially outward at a second top portion 22f by a distance d, subsequently extends toward the first slot 13 circumferentially at a reverse angle of inclination θ, and is linked to a first rectilinear portion 22a in a third layer from the slot opening side of the first slot 13. Here, a radial direction corresponds to a slot depth direction.

In this manner, the first rectilinear portions 22a in the first, third, fifth, and seventh layers of the first slot 13 and the second rectilinear portions 22b in the second, fourth, sixth, and eight layers of the second slot 13 are each linked into a helical shape by the first and second coil ends 22c and 22d. Inclined portions that extend from end portions of the first and second rectilinear portions 22a and 22b to the first and second top portions 22e and 22f are formed so as to have an approximate circular arc shape when viewed from an axial direction. In the slot 13 that the two winding bodies 22 share, the first and second rectilinear portions 22a and 22b of the two winding bodies 22 are housed such that the long sides of the rectangular cross sections of the conductor wires are oriented circumferentially so as to line up alternately in a single column in the radial direction. As shown in FIG. 10, the first and second coil ends 22c and 22d are positioned radially further outward than tip ends of the teeth 12b of the stator core 11, and are positioned radially further inward than bottom portions of the slots 13.

FIGS. 13 and 14 show a state in which eight winding bodies 22 are arranged at a pitch of one slot in a circumferential direction. In FIG. 14, first coil ends 22c that extend outward from the first rectilinear portions 22a of the winding bodies 22 extend circumferentially so as to pass under the first coil ends 22c that extend outward from the first rectilinear portions 22a of the winding bodies 22 on the left, emerge immediately before reaching the first top portions 22e, shift at the first top portions 22e by a distance d radially outward, extend circumferentially so as to pass over the first coil ends 22c of the winding bodies 22 on the left, and are connected to second rectilinear portions 22b.

Similarly, although not depicted, at a rear surface in FIG. 14, second coil ends 22d that extend outward from the second rectilinear portions 22b of the winding bodies 22 extend circumferentially so as to pass over the second coil ends 22d that extend outward from the second rectilinear portions 22b of the winding bodies 22 on the left, shift at the second top portions 22f by a distance d radially outward, extend circumferentially so as to pass under the second coil ends 22d of the winding bodies 22 on the left, and are connected to first rectilinear portions 22a.

As shown in FIGS. 13 and 14, because the first and second rectilinear portions 22a and 22 are shifted by a distance d radially by the first and second top portions 22e and 22f, the eight winding bodies 22 can be arranged at a pitch of one slot in a circumferential direction without interfering with each other. A winding assembly 21 that is shown in FIG. 5 is assembled by arranging forty-eight winding bodies 22 at a pitch of one slot circumferentially. In this winding assembly 21, forty-eight columns of eight first and second rectilinear portions 22a and 22b that are lined up in a single column radially are arranged circumferentially at a pitch of one slot. The respective columns of eight first and second rectilinear portions 22a and 22b that are lined up in a single column radially are housed in each of the slots 13.

Figure 15:
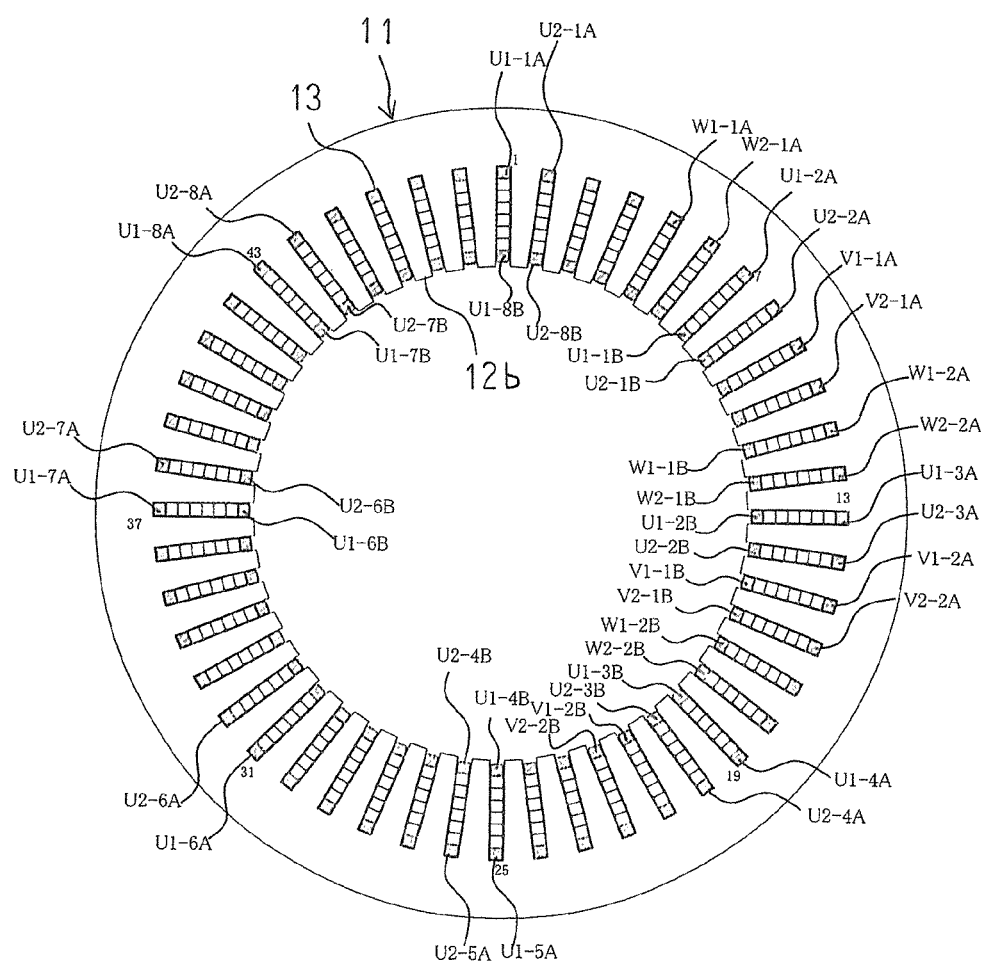
FIG. 15 is an end elevation of the stator in the rotary electric machine according to Embodiment 1 of the present invention when viewed from a side near a second axial end.
Figure 16:
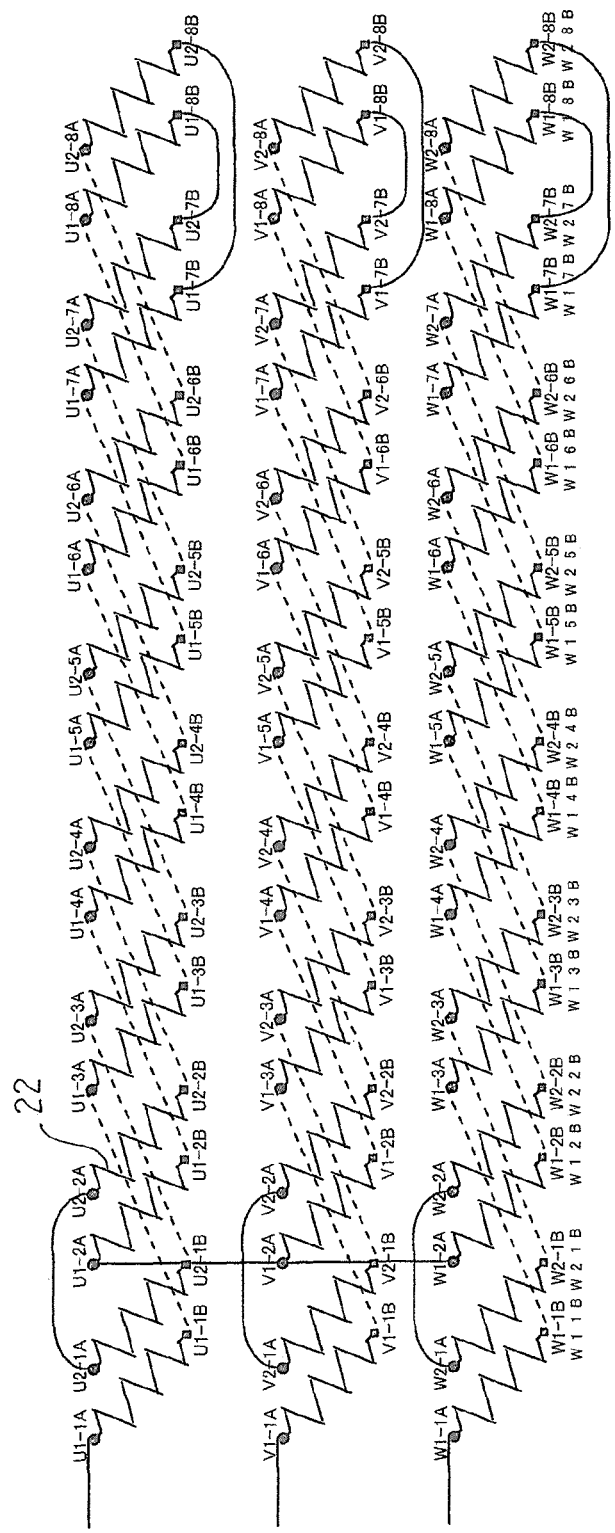
FIG. 16 is a connection diagram for the stator winding in the rotary electric machine according to Embodiment 1 of the present invention.

Next, a connection method for the winding assembly 21 will be explained with reference to FIGS. 15 and 16. FIG. 15 is an end elevation of the stator in the rotary electric machine according to Embodiment 1 of the present invention when viewed from a side near a second axial end, and FIG. 16 is a connection diagram for the stator winding in the rotary electric machine according to Embodiment 1 of the present invention.

In FIG. 15, 1, 7, 13, etc., through 43 are slot numbers that have been allotted to the slots 13 sequentially in a circumferential direction. U1-1A, U1-2A, etc., through U1-8A and U1-1B, U1-2B, etc., through U1-8B are winding ends of the winding bodies 22 that constitute a U1 phase that is mounted into a group of slots 13 at Slot Numbers (1+6n), where n is a natural number that includes 0, and U2-1A, U2-2A, etc., through U2-8A and U2-1B, U2-2B, etc., through U2-8B are winding ends of the winding bodies 22 that constitute a U2 phase that is mounted into a group of slots 13 at Slot Numbers (2+6n).

Winding bodies 22 are also mounted into a slot group at Slot Numbers (3+6n) to constitute a V1 phase, and winding bodies 22 are mounted into a slot group at Slot Numbers (4+6n) to constitute a V2 phase. Winding bodies 22 are also mounted into a slot group at Slot Numbers (5+6n) to constitute a W1 phase, and winding bodies 22 are mounted into a slot group at Slot Numbers (6+6n) to constitute a W2 phase. Here, to facilitate explanation, only V1-1A, V1-2A, V1-1B, and V1-2B (winding ends of the winding bodies 22 that constitute the V1 phase), V2-1A, V2-2A, V2-1B, and V2-2B (winding ends of the winding bodies 22 that constitute the V2 phase), W1-1A, W1-2A, W1-1B, and W1-1B (winding ends of the winding bodies 22 that constitute the W1 phase), and W2-1A, W2-2A, W2-1B, and W2-2B (winding ends of the winding bodies 22 that constitute the W2 phase) are shown.

First, U1-1B and U1-3A, U1-3B and U1-5A, U1-5B and U1-7A, U1-7B and U2-8B, U2-8A and U2-6B, U2-6A and U2-4B, U2-4A and U2-2B, U2-2A and U2-1A, U2-1B and U2-3A, U2-3B and U2-5A, U2-5B and U2-7A, U2-7B and U1-8B, U1-8A and U1-6B, U1-6A and U1-4B, and U1-4A and U1-2B are connected. A U-phase winding in which sixteen winding bodies 22 that constitute a U1 phase and a U2 phase are connected in series is obtained thereby.

Next, V1-1B and V1-3A, V1-3B and V1-5A, V1-5B and V1-7A, V1-7B and V2-8B, V2-8A and V2-6B, V2-6A and V2-4B, V2-4A and V2-2B, V2-2A and V2-1A, V2-1B and V2-3A, V2-3B and V2-5A, V2-5B and V2-7A, V2-7B and V1-8B, V1-8A and V1-6B, V1-6A and V1-4B, and V1-4A and V1-2B are connected. A V-phase winding in which sixteen winding bodies 22 that constitute a V1 phase and a V2 phase are connected in series is obtained thereby.

Next, W1-1B and W1-3A, W1-3B and W1-5A, W1-5B and W1-7A, W1-7B and W2-8B, W2-8A and W2-6B, W2-6A and W2-4B, W2-4A and W2-2B, W2-2A and W2-1A, W2-1B and W2-3A, W2-3B and W2-5A, W2-5B and W2-7A, W2-7B and W1-8B, W1-8A and W1-6B, W1-6A and W1-4B, and W1-4A and W1-2B are connected. A W-phase winding in which sixteen winding bodies 22 that constitute a W1 phase and a W2 phase are connected in series is obtained thereby.

U1-2A, V1-2A, and W1-2A are also connected. A stator winding 20 is thereby obtained that is configured by wye-connecting a U-phase winding in which sixteen winding bodies 22 are connected in series, a V-phase winding in which sixteen winding bodies 22 are connected in series, and a W-phase winding in which sixteen winding bodies 22 are connected in series. This stator winding 20 constitutes a three-phase alternating-current winding that is a distributed winding of full-pitch windings.

A rotary electric machine 100 that uses the stator winding 20 that is connected in this manner operates as an 8-pole 48-slot inner-rotor three-phase motor when predetermined alternating-current power is supplied to the stator winding 20.

In the rotary electric machine 100 that is configured in this manner, a stator winding 20 is constituted by a winding assembly 21 that is configured such that winding bodies 22 that are produced by winding conductor wires for four turns into a helical shape are arranged at a pitch of one slot circumferentially. Thus, the winding bodies 22 have a dimension of one pole, and the length of the conductor wires is significantly shorter than in the stator winding that is described in Patent Literature 2, reducing the scale of manufacturing apparatus, and enabling reductions in price to be achieved. Because the winding bodies 22 can easily be produced with different axial lengths in the first and second rectilinear portions 22a and 22b, adaptation to changes in the stator core 11 to which they are mounted can be made inexpensively and simply.

In addition, the number of welds is significantly reduced compared to the stator winding that is described in Patent Literature 3, simplifying welding processes and insulating treatment processes between the weld portions, and enabling cost reductions to be achieved.

The winding bodies 22 are configured such that first and second coil ends 22c and 22d are shifted at the first and second top portions 22e and 22f in a radial direction by a gap d that is approximately equal to the radial dimensions of the first and second rectilinear portions 22a and 22b. Thus, the radial and axial dimensions of the coil end groups are reduced compared to the stator winding that is described in Patent Literature 1, enabling downsizing of the rotary electric machine 100 to be achieved. The length of the conductor wires is also shorter, enabling reductions in the resistance of the stator winding 20, thereby enabling the efficiency of the rotary electric machine 100 to be improved. In addition, reductions in weight are also enabled because heat generation in the stator winding 20 is suppressed, enabling thermal degradation of the parts used to be suppressed, and the length of the conductor wires is shorter.

Because the winding bodies 22 are configured such that the first and second coil ends 22c and 22d are shifted at the first and second top portions 22e and 22f in a radial direction by a gap d that is approximately equal to the radial dimensions of the first and second rectilinear portions 22a and 22b, the winding bodies 22 can be arranged at a pitch of one slot without interference, improving assembly of the winding assembly 21. Because a winding assembly 21 is assembled by arranging identically shaped winding bodies 22 circumferentially at a pitch of one slot, it is not necessary to produce other types of winding bodies, reducing the number of units of manufacturing equipment, simplifying the configuration of the equipment, and improving mass producibility.

The U-phase, V-phase, and W-phase windings that constitute the stator winding 20 are each configured by connecting in series winding bodies 22 that are mounted into adjacent slots 13. Because the winding bodies 22 that are mounted into the adjacent slots 13 have different electrical angles, voltages that are induced by the rotor 5 in the winding bodies 22 that are mounted into the adjacent slots 13 are different, reducing eddy currents that flow inside the conductor wires.

The first and second coil ends 22c and 22d are constituted by two circular arc shapes that are shifted by a gap d radially at the first and second top portions 22e and 22f when viewed from an axial direction, and the first and second coil ends 22c and 22d are positioned radially further outward than the tip end surfaces of the teeth 12b of the stator core 11. Thus, interference between the first and second coil ends 22c and 22d and the rotor 5 is reliably prevented. Because the first and second coil ends 22c and 22d are also positioned radially inside the core back portion 12a of the stator core 11, vacant space that is formed axially outside the core back portion 12a can be used as installation space for cooling members, etc.

Because the first and second rectilinear portions 22a and 22b are arranged in a single column radially inside the slots 13 such that long-side directions of the rectangular cross sections are oriented circumferentially, dimensions are reduced in the slot depth direction, enabling downsizing of the radial dimensions of the rotary electric machine 100 to be achieved.

The angles of inclination of the first and second coil ends 22c and 22d of the winding bodies 22 that are arranged radially are approximately equal, and a height of the first and second top portions 22e and 22f of the first and second coil ends 22c and 22d from the axial end surface of the stator core 11 becomes gradually lower radially inward. Thus, when assembling the winding assembly 21, the winding bodies 22 can be moved circumferentially without interference, and the length of the conductor wires that constitute the winding bodies 22 is also shorter, enabling reductions in the resistance of the stator winding 20 to be achieved.

Moreover, in Embodiment 1 above, the winding bodies 22 are produced using conductor wire that has a rectangular cross section, but the cross sectional shape of the conductor wire that constitutes the winding bodies is not limited to a rectangular shape, and conductor wire that has a circular cross section or a square cross section may be used, for example.

In Embodiment 1 above, the first and second rectilinear portions 22a and 22b are arranged in a single column radially inside the slots 13 such that long-side directions of the rectangular cross sections are oriented circumferentially, but the first and second rectilinear portions 22a and 22b may be arranged in a single column radially inside the slots 13 such that short-side directions of the rectangular cross sections are oriented circumferentially.

In Embodiment 1 above, insulation between the weld portions of the first and second winding ends 22g and 22h of the winding bodies 22 is not described at all, but an electrically insulating resin should be applied to the weld portions, for example. Because the conductor wires are insulated, there is no problem with insulation between the first and second rectilinear portions 22a and 22b and the teeth 12b, but if insulating paper, for example, is interposed between the first and second rectilinear portions 22a and 22b and the teeth 12b, then insulation between the first and second rectilinear portions 22a and 22b and the teeth 12b is reliably ensured.

Figure 27:
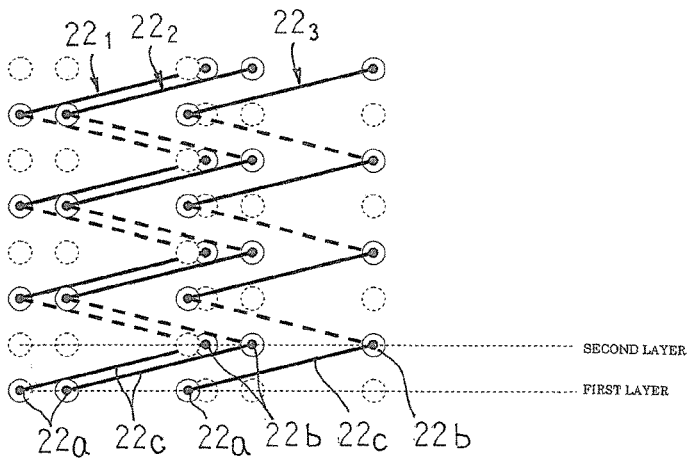
FIG. 27 is a schematic diagram that explains the method for assembling the winding assembly in the rotary electric machine according to Embodiment 1 of the present invention.
Figure 28:
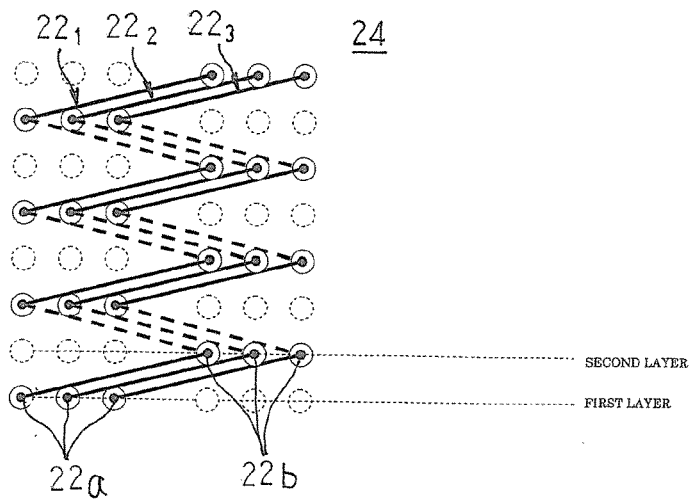
FIG. 28 is a schematic diagram that explains the method for assembling the winding assembly in the rotary electric machine according to Embodiment 1 of the present invention.
Figure 29:
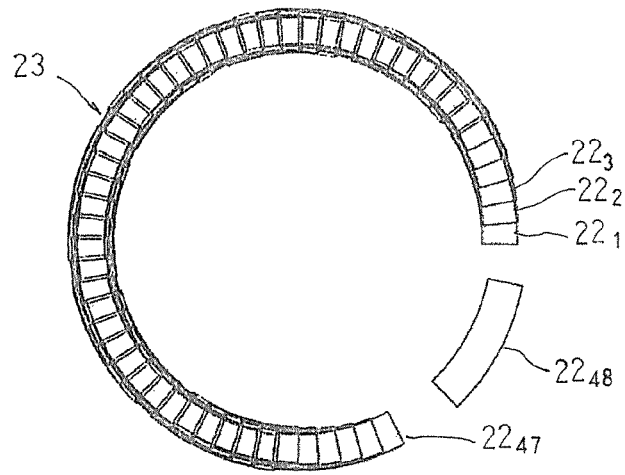
FIG. 29 is a schematic diagram that explains a procedure for installing a forty-eighth winding body in the method for assembling the winding assembly in the rotary electric machine according to Embodiment 1 of the present invention.
Figure 30:
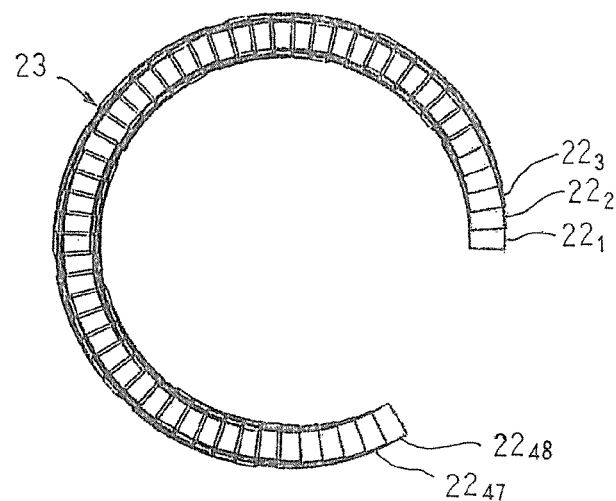
FIG. 30 is a schematic diagram that explains the procedure for installing the forty-eighth winding body in the method for assembling the winding assembly in the rotary electric machine according to Embodiment 1 of the present invention.
Figure 31:
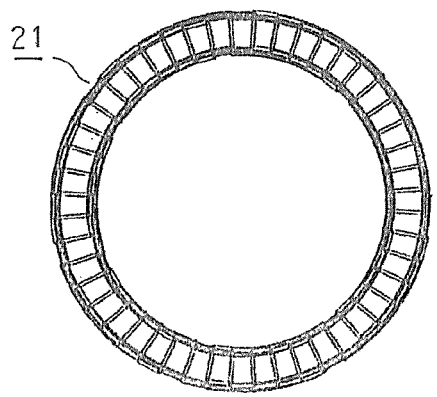
FIG. 31 is a schematic diagram that explains the procedure for installing the forty-eighth winding body in the method for assembling the winding assembly in the rotary electric machine according to Embodiment 1 of the present invention.
Figure 32:
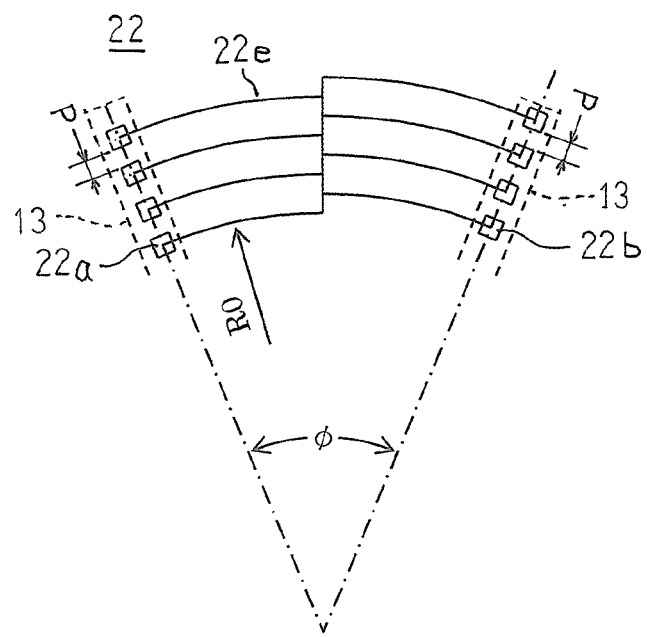
FIG. 32 is a schematic diagram of the winding bodies that constitute the winding assembly in which an outside diameter is a final outside diameter R0 in the rotary electric machine according to Embodiment 1 of the present invention when viewed from an axial direction.
Figure 33:
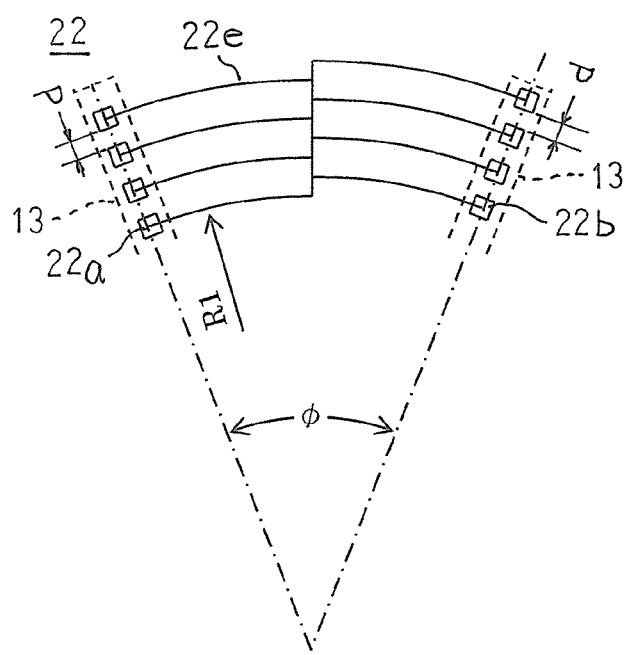
FIG. 33 is a schematic diagram of the winding bodies that constitute the winding assembly in which an outside diameter is an outside diameter R1 that is greater than the final outside diameter R0 in the rotary electric machine according to Embodiment 1 of the present invention when viewed from the axial direction.
Figure 34:
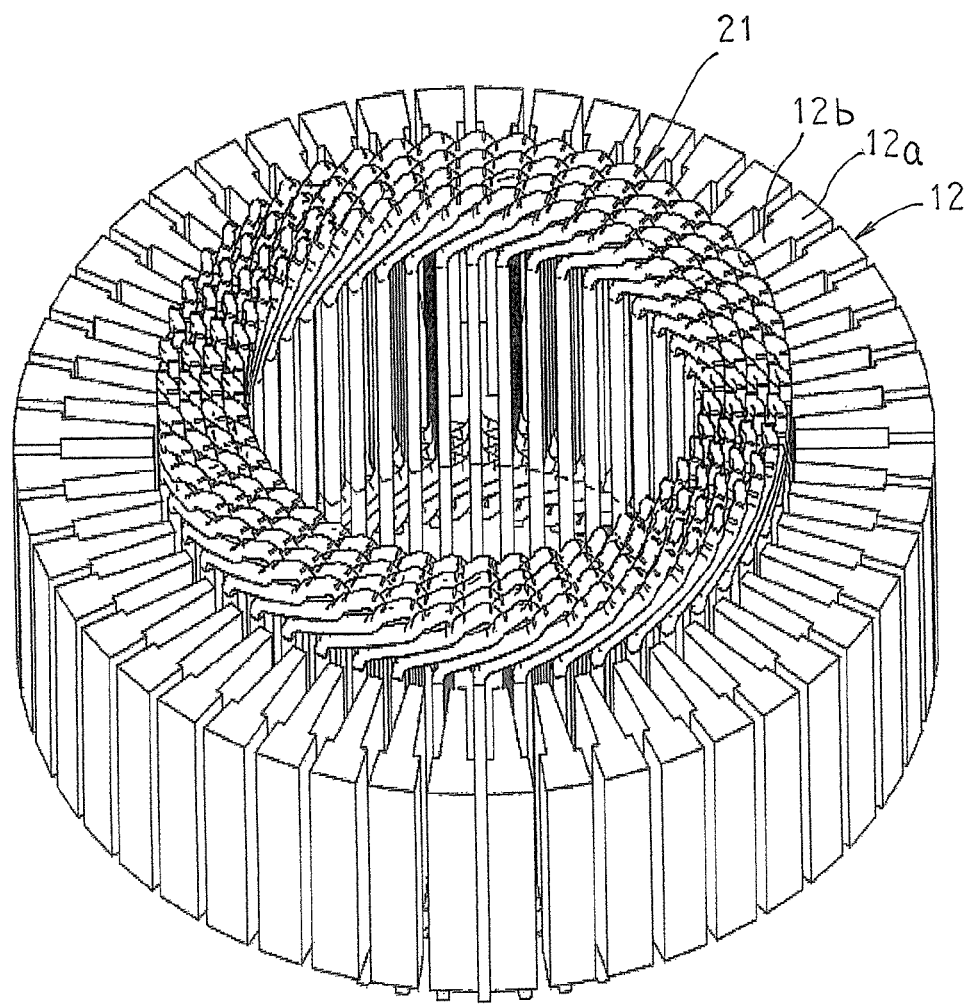
FIG. 34 is a diagram that explains the method for assembling the stator in the rotary electric machine according to Embodiment 1 of the present invention.
Figure 35:
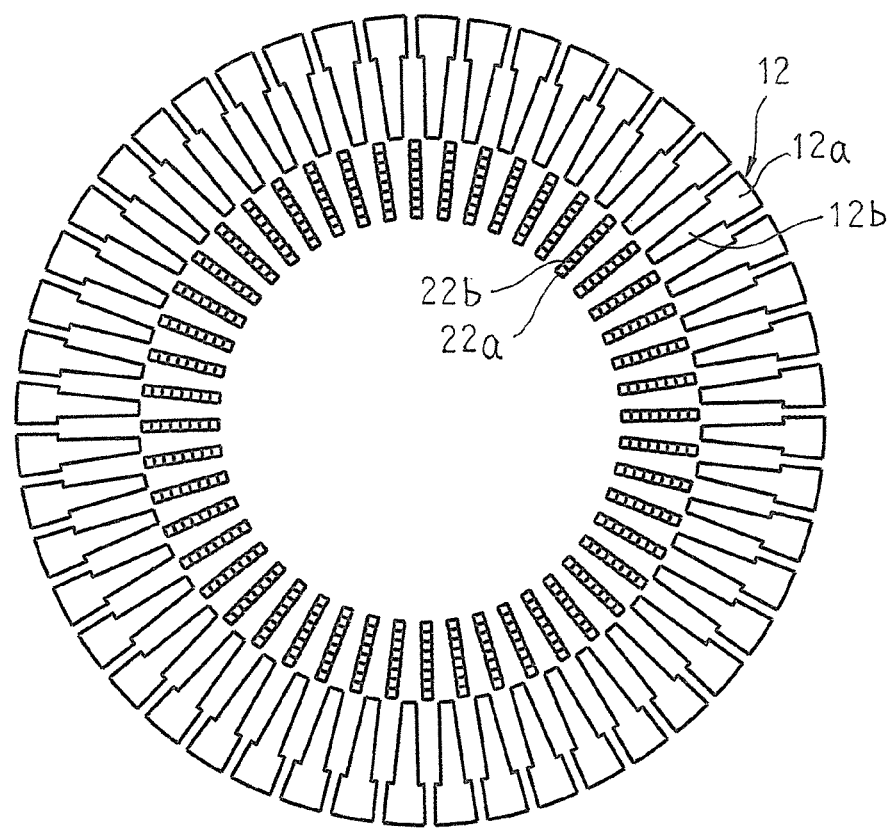
FIG. 35 is a diagram that explains the method for assembling the stator in the rotary electric machine according to Embodiment 1 of the present invention.
Figure 36:
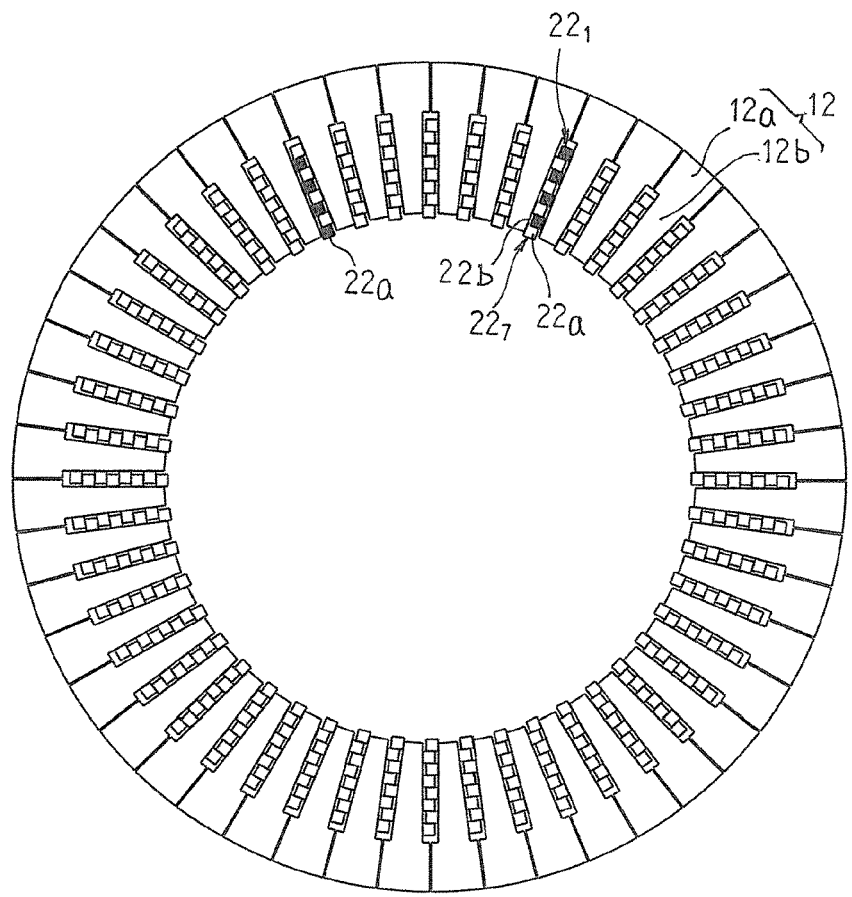
FIG. 36 is a diagram that explains the method for assembling the stator in the rotary electric machine according to Embodiment 1 of the present invention.
Figure 37:
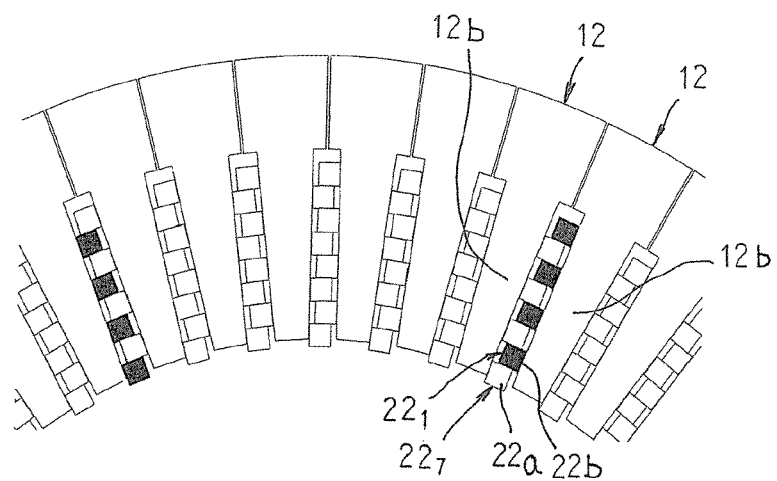
FIG. 37 is a partial enlargement that explains the method for assembling the stator in the rotary electric machine according to Embodiment 1 of the present invention.
Figure 38:
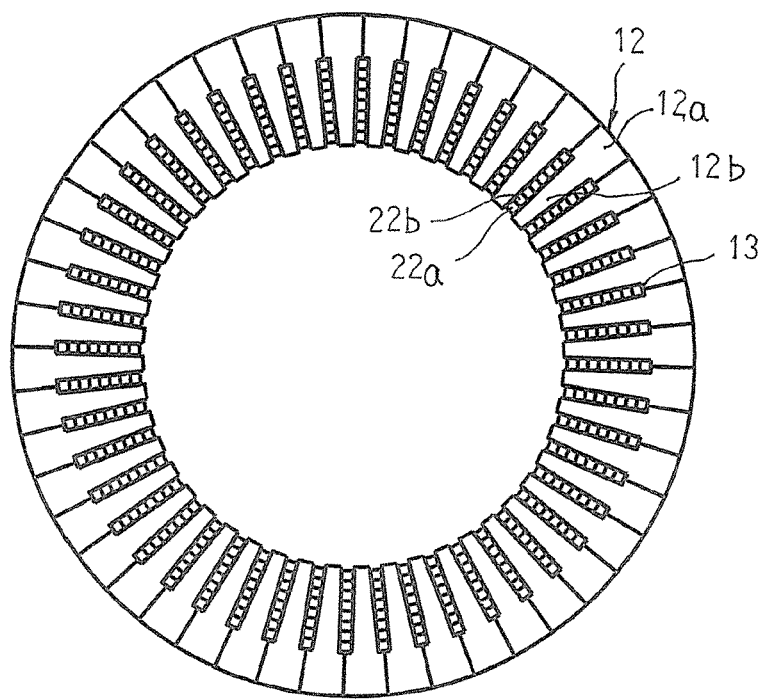
FIG. 38 is a diagram that explains the method for assembling the stator in the rotary electric machine according to Embodiment 1 of the present invention.
Figure 39:
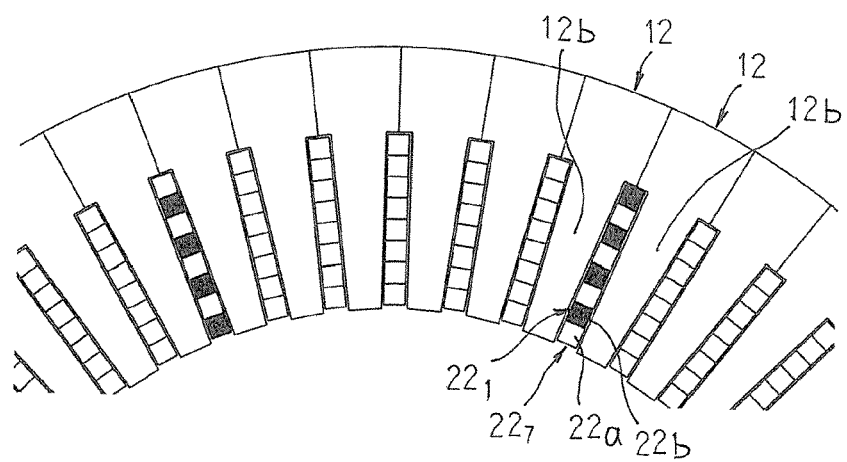
FIG. 39 is a partial enlargement that explains the method for assembling the stator in the rotary electric machine according to Embodiment 1 of the present invention.

Next, a method for assembling the stator 10 will be explained with reference to drawings. FIGS. 17 through 22 are each oblique projections that explain a method for assembling the winding assembly in the rotary electric machine according to Embodiment 1 of the present invention, FIGS. 23 through 28 are each schematic diagrams that explain the method for assembling the winding assembly in the rotary electric machine according to Embodiment 1 of the present invention, FIGS. 29 through 31 are each schematic diagrams that explain a procedure for installing a forty-eighth winding body in the method for assembling the winding assembly in the rotary electric machine according to Embodiment 1 of the present invention, FIG. 32 is a schematic diagram of the winding bodies that constitute the winding assembly in which an outside diameter is a final outside diameter R0 in the rotary electric machine according to Embodiment 1 of the present invention when viewed from an axial direction, and FIG. 33 is a schematic diagram of a single winding body that constitutes the winding assembly in which an outside diameter is an outside diameter R1 that is greater than the final outside diameter R0 in the rotary electric machine according to Embodiment 1 of the present invention when viewed from the axial direction. FIGS. 34 through 39 are each diagrams that explain the method for assembling the stator in the rotary electric machine according to Embodiment 1 of the present invention, FIGS. 34 and 35 showing a state before stator assembly, FIG. 36 showing a state immediately before core back portions of adjacent core blocks are placed in contact, FIG. 37 showing the state immediately before the core back portions of the adjacent core blocks are placed in contact enlarged, FIG. 38 showing a state after stator assembly, and FIG. 39 showing the state after stator assembly enlarged. Moreover, in FIGS. 35 through 39, for simplicity, only the first and second rectilinear portions 22a and 22b of the winding assembly 21 are shown.

First, winding bodies 22 are produced by winding conductor wires for four turns into a helical shape. Here, to facilitate explanation, the winding bodies 22 are designated winding body $22_1$, winding body $22_2$, winding body $22_3$, winding body $22_{47}$, and winding body $22_{48}$ in order of mounting.

Figure 17:
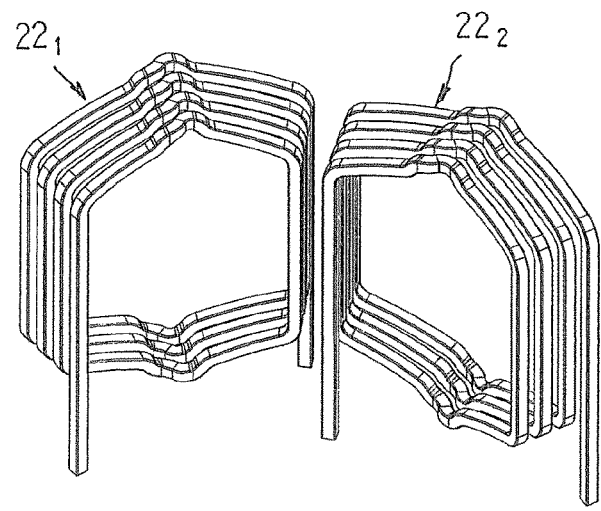
FIG. 17 is an oblique projection that explains a method for assembling the winding assembly in the rotary electric machine according to Embodiment 1 of the present invention.
Figure 18:
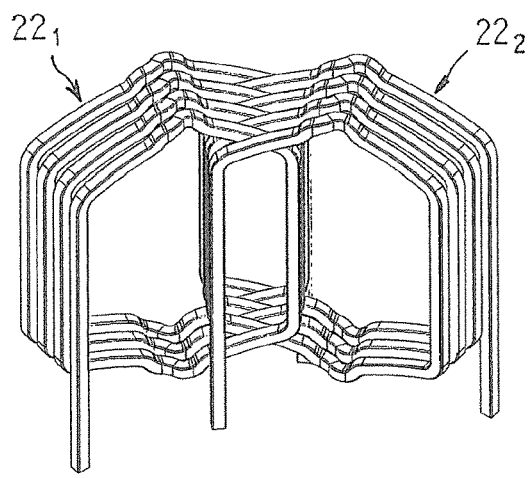
FIG. 18 is an oblique projection that explains the method for assembling the winding assembly in the rotary electric machine according to Embodiment 1 of the present invention.
Figure 19:
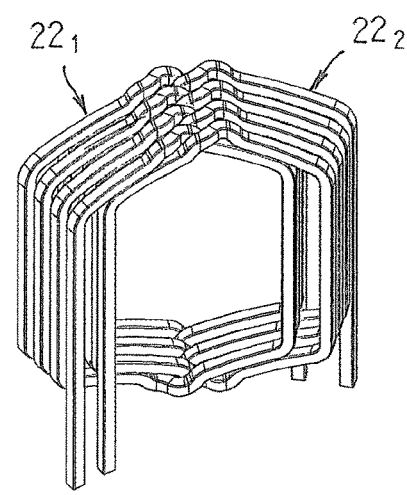
FIG. 19 is an oblique projection that explains the method for assembling the winding assembly in the rotary electric machine according to Embodiment 1 of the present invention.
Figure 23:
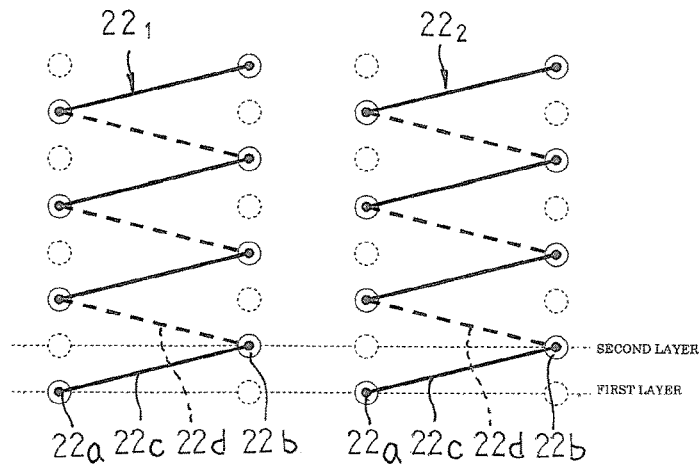
FIG. 23 is a schematic diagram that explains the method for assembling the winding assembly in the rotary electric machine according to Embodiment 1 of the present invention.
Figure 24:
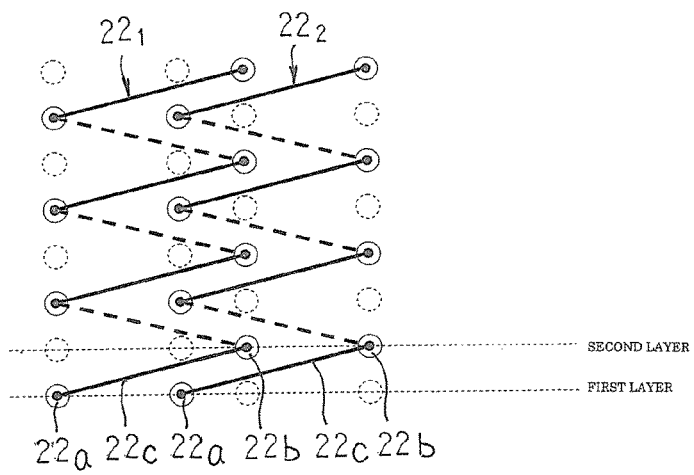
FIG. 24 is a schematic diagram that explains the method for assembling the winding assembly in the rotary electric machine according to Embodiment 1 of the present invention.
Figure 25:
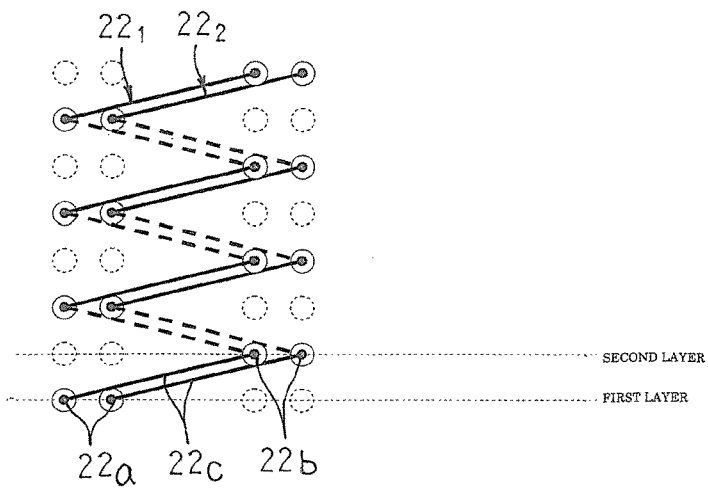
FIG. 25 is a schematic diagram that explains the method for assembling the winding assembly in the rotary electric machine according to Embodiment 1 of the present invention.

Then, as shown in FIGS. 17 and 23, the first and second winding bodies $22_1$ and $22_2$ are placed circumferentially adjacent to each other so as to align axial height positions. Next, as shown in FIGS. 18 and 24, the first rectilinear portions 22a of the second winding body $22_2$ are inserted between the second rectilinear portions 22b of the first winding body $22_1$. Next, the second winding body $22_2$ is moved circumferentially until the first rectilinear portions 22a of the second winding body $22_2$ are at a position that is separated by a pitch of one slot (the angle between the slots) from the first rectilinear portions 22a of the first winding body $22_1$. The two winding bodies $22_1$ and $22_2$ are thereby assembled as shown in FIGS. 19 and 25. In the assemblage of the two winding bodies $22_1$ and $22_2$, the conductor wire of the winding body $22_2$ enters the gaps between the conductor wire of the winding body $22_1$, overlapping with each other radially and increasing rigidity.

Figure 20:
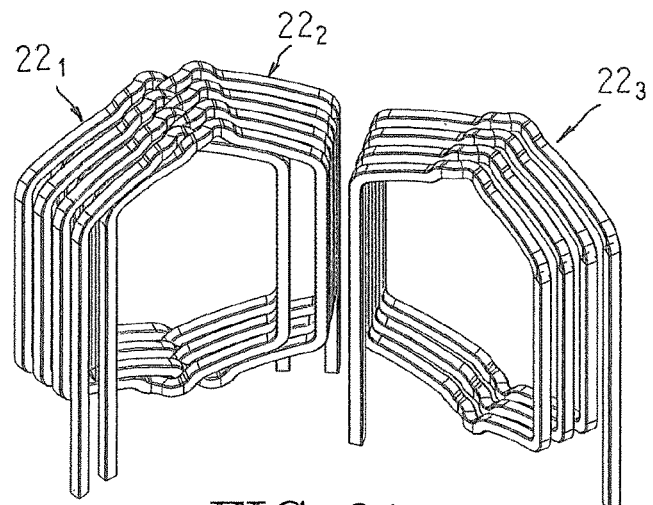
FIG. 20 is an oblique projection that explains the method for assembling the winding assembly in the rotary electric machine according to Embodiment 1 of the present invention.
Figure 21:
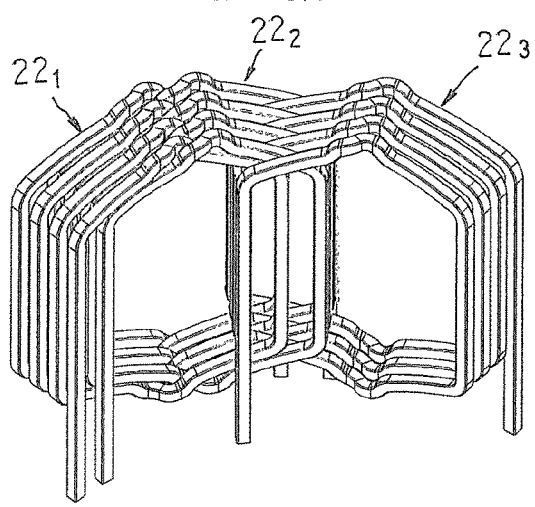
FIG. 21 is an oblique projection that explains the method for assembling the winding assembly in the rotary electric machine according to Embodiment 1 of the present invention.
Figure 22:
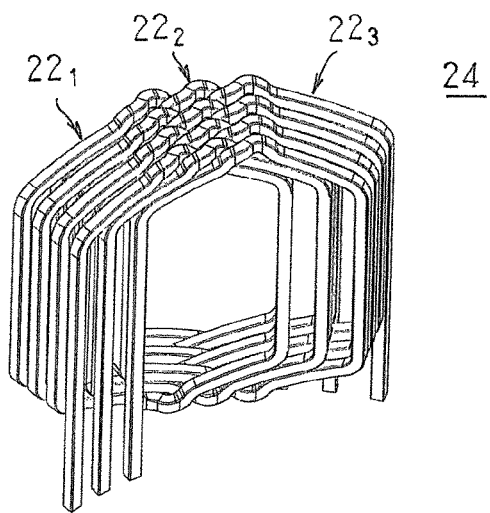
FIG. 22 is an oblique projection that explains the method for assembling the winding assembly in the rotary electric machine according to Embodiment 1 of the present invention.
Figure 26:
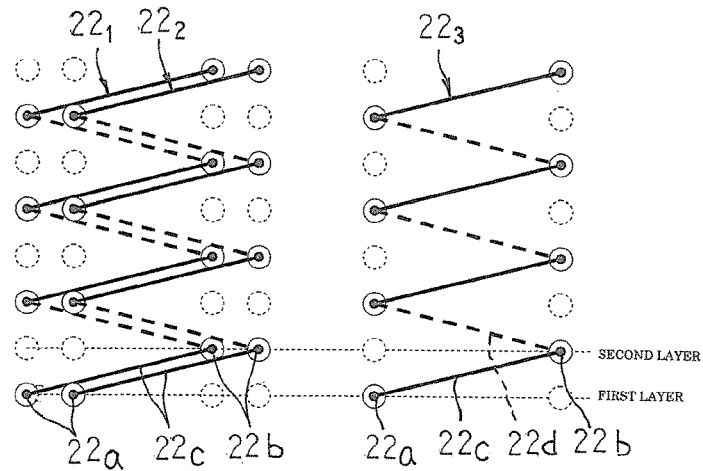
FIG. 26 is a schematic diagram that explains the method for assembling the winding assembly in the rotary electric machine according to Embodiment 1 of the present invention.

Next, as shown in FIGS. 20 and 26, the third winding body $22_3$ is placed circumferentially adjacent to the assemblage of the two winding bodies $22_1$ and $22_2$ so as to align axial height positions. Next, as shown in FIGS. 21 and 27, the first rectilinear portions 22a of the third winding body $22_3$ are inserted between the second rectilinear portions 22b of the winding bodies $22_1$ and $22_2$. Next, the third winding body $22_3$ is moved circumferentially until the first rectilinear portions 22a of the third winding body $22_3$ are at a position that is separated by a pitch of one slot (the angle between the slots) from the first rectilinear portions 22a of the second winding body $22_2$. A sub-assembly 24 that is constituted by the three winding bodies $22_1$, $22_2$, and $22_3$ is thereby assembled as shown in FIGS. 22 and 28.

The winding bodies 22 are mounted sequentially in a similar manner by aligning axial height positions and moving them circumferentially until the forty-seventh winding body $22_{47}$. As shown in FIG. 29, the assemblage 23 in which the forty-seven winding bodies $22_1$ through $22_{47}$ are assembled is increased in diameter to form a C shape that is wider than a circumferential width of the forty-eighth winding body $22_{48}$ between the first winding body $22_1$ and the forty-seventh winding body $22_{47}$.

Next, as shown in FIG. 30, the forty-eighth winding body $22_{48}$ is mounted onto an end near the forty-seventh winding body $22_{47}$. In addition, as shown in FIG. 31, an opening of the C-shaped assemblage 23 is closed, and the first winding body $22_1$ and the forty-eighth winding body $22_{48}$ are fitted together, to assemble the annular winding assembly 21.

In the winding assembly 21 that is assembled in this manner, forty-eight columns of eight first and second rectilinear portions 22a and 22b are arranged at an approximately uniform angular pitch. Then, each of the winding bodies 22 of the winding assembly 21 is moved slightly radially outward to make an outside diameter of the winding assembly 21 greater than a final outside diameter (the outside diameter of the winding assembly 21 when installed in the stator core 11). Spacing between the columns of the first and second rectilinear portions 22a and 22b is widened thereby.

Here, in the winding bodies 22 that constitute the winding assembly 21 that has a final outside diameter R0, as shown in FIG. 32, the four first rectilinear portions 22a that are housed in the first slots 13 are arranged in a straight line so as to leave a spacing d, and the four second rectilinear portions 22b that are housed in the second slots 13 are arranged in a straight line so as to leave a spacing d. In a single winding body 22 of the winding assembly 21 that has an outside diameter R1 that is greater than the final outside diameter R0, as shown in FIG. 33, an angle θ that is formed by the first rectilinear portions 22a and the second rectilinear portions 22b is reduced in inverse proportion to the change in outside diameter (R0→R1).

Next, forty-eight core blocks 12 are arranged at an approximately uniform angular pitch circumferentially such that respective teeth are positioned on a radially outer side between adjacent columns of first and second rectilinear portions 22a and 22b of the winding assembly 21 that has an outside diameter R1, as shown in FIGS. 34 and 35. Next, the core blocks 12 that are arranged in a row circumferentially are simultaneously moved radially inward. The respective teeth 12b of the core blocks 12 are thereby inserted between the adjacent columns of first and second rectilinear portions 22a and 22b.

At this point, as shown in FIGS. 36 and 37, the tooth 12b of the core block 12 on the right contacts the second rectilinear portions 22b of the first winding body $22_1$ of the winding assembly 21 that has an outside diameter R1, and the tooth 12b of the core block 12 on the left contacts the first rectilinear portions 22a of the seventh winding body $22_7$.

Then, when the core blocks 12 that are arranged in a row circumferentially are moved further radially inward, the first and second rectilinear portions 22a and 22b in each column are moved by the tapered teeth 12b so as to line up in a single column. The winding assembly 21 is thereby reduced in diameter, and the second rectilinear portions 22b that are positioned on the outermost radius of the winding assembly 21 come into contact with the core back portions 12a of the adjacent core blocks 12. In addition, when the core blocks 12 that are arranged in a row circumferentially are moved further radially inward, the circumferential side surfaces of the adjacent core blocks 12 are abutted with each other, preventing radially inward movement of the core blocks 12, and the winding assembly 21 is thereby mounted onto the stator core 11, as shown in FIGS. 38 and 39. Inside each of the slots 13, eight first and second rectilinear portions 22a and 22b are housed such that the long sides of the rectangular cross sections are oriented circumferentially so as to line up neatly in a single column in a radial direction.

Thus, by moving the core blocks 12 that are arranged in a row circumferentially radially inward so as to be inserted into the winding assembly 21, the first and second rectilinear portions 22a and 22b that are lined up irregularly in the radial direction are arranged neatly in a column by the movement that narrows the spacing between the teeth 12b of the adjacent core blocks 21. In addition, gaps between each of the first and second rectilinear portions 22a and 22b that are arranged neatly in a column in the radial direction are reduced or eliminated by the radially inward movement of the core back portions 12a of the core blocks 12. Thus, space factor of the conductor wires inside the slots 13 can be improved. Because the conductor wires inside the slots 13 and the core blocks 12 are in contact with each other, and heat transfer performance from the winding assembly 21, which constitutes a heat-generating body during passage of electric current, to the armature core 11 can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the armature winding 20 and the core blocks 12 is suppressed, enabling damage to insulating coatings of the conductor wires to be prevented.

According to Embodiment 1, because a stator 10 is assembled by assembling a winding assembly 21 by arranging forty-eight winding bodies 22 at a pitch of one slot circumferentially, and by inserting teeth 12b of core blocks 12 between columns of first and second rectilinear portions 22a and 22b from an outer circumferential side of the winding assembly 21, workability during assembly of the stator 10 is improved.

Winding bodies 22 are configured such that first and second coil ends 22c and 22d are shifted at first and second top portions 22e and 22f in a radial direction by a gap d that is approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

An outside diameter of the winding assembly 21 is enlarged before the step of inserting the teeth 12b of the core blocks 12 between the columns of first and second rectilinear portions 22a and 22b from the outer circumferential side of the winding assembly 21. Thus, mounting of the core blocks 12 into the winding assembly 21 is simplified, improving workability during assembly of the stator 10. Because tapered teeth 12b are inserted between each of the columns of first and second rectilinear portions 22a and 22b from radially outside and moved radially inward, the first and second rectilinear portions 22a and 22b are arranged neatly into single columns. In addition, after the second rectilinear portions 22b that are positioned on the outermost radius of the winding assembly 21 come into contact with the core back portions 12a of the adjacent core blocks 12, the motive force of the core blocks 12 acts so as to push the second rectilinear portions 22b that are positioned on the outermost radius radially inward until the circumferential side surfaces of the adjacent core blocks 12 are abutted with each other. The winding assembly 21 is thereby reduced in diameter to a final diameter such that each of the columns of first and second rectilinear portions 22a and 22b is arranged neatly, and is housed inside the slots 13 at a high density.

Moreover, in Embodiment 1 above, the diameter of the winding assembly 21 is enlarged by moving each of the winding bodies 22 of the winding assembly 21 slightly radially outward before the step of inserting the core blocks 12 between the columns of first and second rectilinear portions 22a and 22b of the winding assembly 21, but an enlarged winding assembly may be assembled by making a pitch of circumferential arrangement of the winding bodies 22 greater than a pitch of one slot.

In Embodiment 1 above, core blocks 12 in which the annular stator core 11 is divided into forty-eight equal sections, in which a single tooth 12b is disposed so as to protrude from a circular arc-shaped core back portion 12a, are used, but core blocks may be used in which two core blocks 12 are produced integrally in a single body, i.e., in which two teeth are disposed so as to protrude from a circular arc-shaped core back portion. In that case, workability during assembly of the stator 10 is improved because the number of the core blocks is reduced to half.

In Embodiment 1 above, the winding assembly 21 is assembled by moving the forty-eight winding bodies 22 circumferentially one at a time, but sub-assemblies 24 that are constituted by the three winding bodies 22 that are shown in FIG. 22 may be assembled by moving the three winding bodies 22 circumferentially one at a time, for example, and the winding assembly 21 may be assembled by moving the sub-assemblies 24 circumferentially one at a time. In that case, it is necessary to spread an opening width of the C-shaped assemblage wider than a circumferential width of a sub-assembly 24 before mounting the last one. Furthermore, because rigidity of a sub-assembly 24 that is constituted by three winding bodies 22 is increased compared to that of a single winding body 22, handling is facilitated, improving workability during assembly of the winding assembly. The number of winding bodies 22 that constitute the sub-assemblies 24 is not limited to three, provided that it is plural.

Embodiment 2

Figure 40:
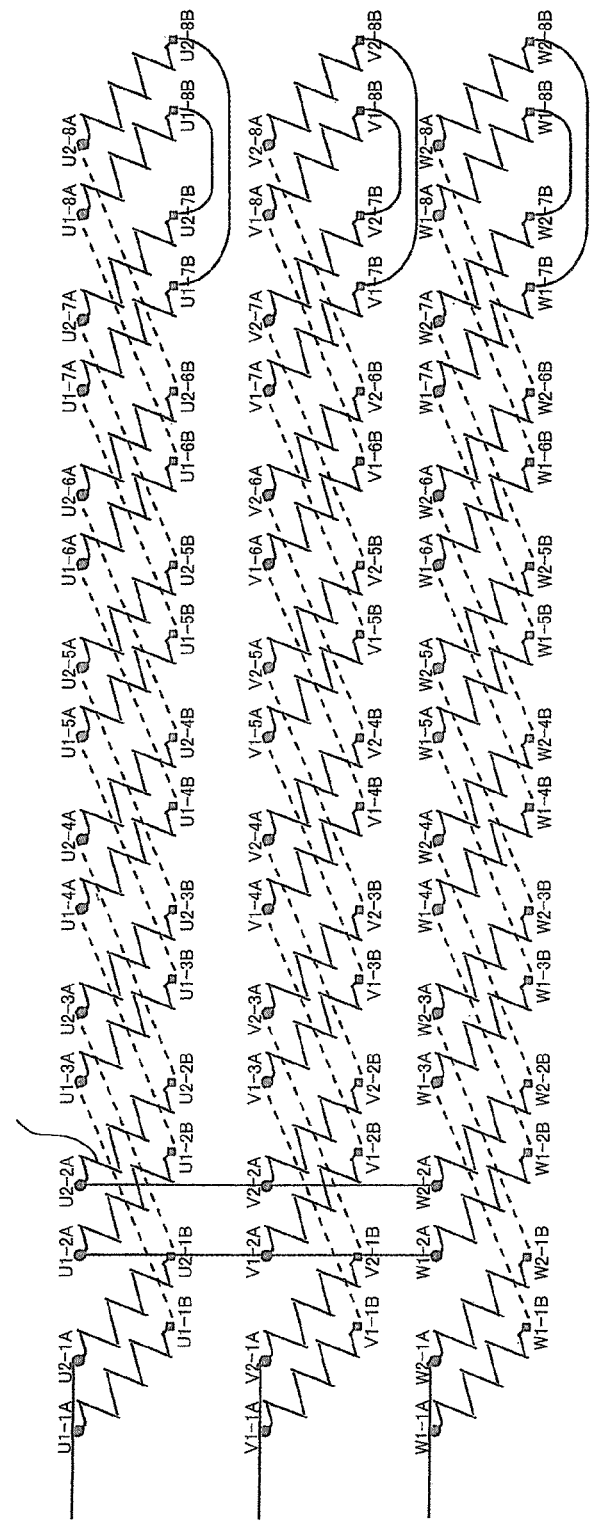
FIG. 40 is a connection diagram for a stator winding in a rotary electric machine according to Embodiment 2 of the present invention.

FIG. 40 is a connection diagram for a stator winding in a rotary electric machine according to Embodiment 2 of the present invention.

In Embodiment 2, as shown in FIG. 40, U1-1A and U2-1A are first connected. Then, U1-1B and U1-3A, U1-3B and U1-5A, U1-5B and U1-7A, U1-7B and U2-8B, U2-8A and U2-6B, U2-6A and U2-4B, and U2-4A and U2-2B are connected. Next, U2-1B and U2-3A, U2-3B and U2-5A, U2-5B and U2-7A, U2-7B and U1-8B, U1-8A and U1-6B, U1-6A and U1-4B, and U1-4A and U1-2B are connected. A U-phase winding is obtained thereby in which two winding groups are connected in parallel, eight winding bodies 22 that constitute a U1 phase and a U2 phase being connected in series in each of the winding groups.

V1-1A and V2-1A are also connected. Then, V1-1B and V1-3A, V1-3B and V1-5A, V1-5B and V1-7A, V1-7B and V2-8B, V2-8A and V2-6B, V2-6A and V2-4B, and V2-4A and V2-2B are connected. Next, V2-1B and V2-3A, V2-3B and V2-5A, V2-5B and V2-7A, V2-7B and V1-8B, V1-8A and V1-6B, V1-6A and V1-4B, and V1-4A and V1-2B are connected. A V-phase winding is obtained thereby in which two winding groups are connected in parallel, eight winding bodies 22 that constitute a V1 phase and a V2 phase being connected in series in each of the winding groups.

W1-1A and W2-1A are also connected. Then, W1-1B and W1-3A, W1-3B and W1-5A, W1-5B and W1-7A, W1-7B and W2-8B, W2-8A and W2-6B, W2-6A and W2-4B, and W2-4A and W2-2B are connected. Next, W2-1B and W2-3A, W2-3B and W2-5A, W2-5B and W2-7A, W2-7B and W1-8B, W1-8A and W1-6B, W1-6A and W1-4B, and W1-4A and W1-2B are connected. A W-phase winding is obtained thereby in which two winding groups are connected in parallel, eight winding bodies 22 that constitute a W1 phase and a W2 phase being connected in series in each of the winding groups.

U1-2A, V1-2A, and W1-2A are also connected, and U2-2A, V2-2A, and W2-2A are connected. A stator winding 20A is thereby obtained that is configured by wye-connecting a U-phase winding in which two winding groups in each of which eight winding bodies 22 are connected in series are connected in parallel, a V-phase winding in which two winding groups in each of which eight winding bodies 22 are connected in series are connected in parallel, and a W-phase winding in which two winding groups in each of which eight winding bodies 22 are connected in series are connected in parallel. This stator winding 20A constitutes a three-phase alternating-current winding that is a distributed winding of full-pitch windings.

A rotary electric machine that uses the stator winding 20A that is connected in this manner operates as an 8-pole 48-slot inner-rotor three-phase motor when predetermined alternating-current power is supplied to the stator winding 20A.

Embodiment 3

Figure 41:
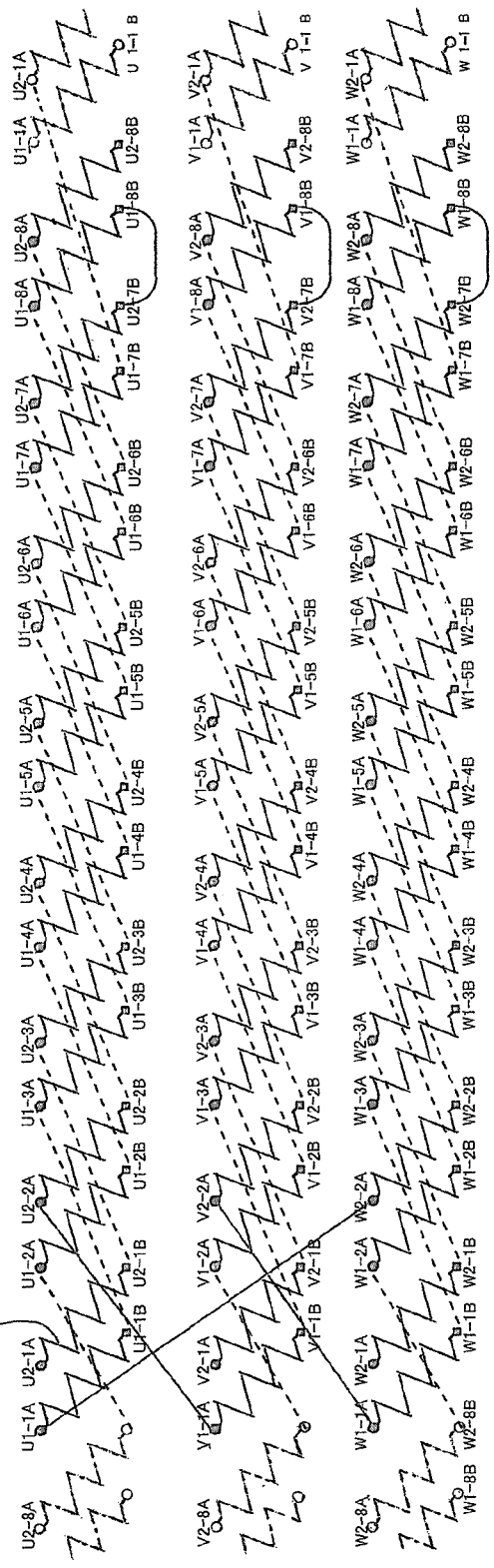
FIG. 41 is a connection diagram for a stator winding in a rotary electric machine according to Embodiment 3 of the present invention.

FIG. 41 is a connection diagram for a stator winding in a rotary electric machine according to Embodiment 3 of the present invention.

In Embodiment 3, as shown in FIG. 41, first, U1-1B and U1-3A, U1-3B and U1-5A, U1-5B and U1-7A, U1-7B and U2-1A, U2-1B and U2-3A, U2-3B and U2-5A, U2-5B and U2-7A, U2-7B and U1-8B, U1-8A and U1-6B, U1-6A and U1-4B, U1-4A and U1-2B, U1-2A and U2-8B, U2-8A and U2-6B, U2-6A and U2-4B, U2-4A and U2-2B are connected. A U-phase winding in which sixteen winding bodies 22 that constitute a U1 phase and a U2 phase are connected in series is obtained thereby.

Next, V1-1B and V1-3A, V1-3B and V1-5A, V1-5B and V1-7A, V1-7B and V2-1A, V2-1B and V2-3A, V2-3B and V2-5A, V2-5B and V2-7A, V2-7B and V1-8B, V1-8A and V1-6B, V1-6A and V1-4B, V1-4A and V1-2B, V1-2A and V2-8B, V2-8A and V2-6B, V2-6A and V2-4B, and V2-4A and V2-2B are connected. A V-phase winding in which sixteen winding bodies 22 that constitute a V1 phase and a V2 phase are connected in series is obtained thereby.

Then, W1-1B and W1-3A, W1-3B and W1-5A, W1-5B and W1-7A, W1-7B and W2-1A, W2-1B and W2-3A, W2-3B and W2-5A, W2-5B and W2-7A, W2-7B and W1-8B, W1-8A and W1-6B, W1-6A and W1-4B, W1-4A and W1-2B, W1-2A and W2-8B, W2-8A and W2-6B, W2-6A and W2-4B, and W2-4A and W2-2B are connected. A W-phase winding in which sixteen winding bodies 22 that constitute a W1 phase and a W2 phase are connected in series is obtained thereby.

In addition, U2-2A and V1-1A are connected, V2-2A and W1-1A are connected, and W2-2A and U1-1A are connected. A stator winding 20B is thereby obtained that is configured by delta-connecting a U-phase winding in which sixteen winding bodies 22 are connected in series, a V-phase winding in which sixteen winding bodies 22 are connected in series, and a W-phase winding in which sixteen winding bodies 22 are connected in series. This stator winding 20B constitutes a three-phase alternating-current winding that is a distributed winding of full-pitch windings.

A rotary electric machine that uses the stator winding 20B that is connected in this manner operates as an 8-pole 48-slot inner-rotor three-phase motor when predetermined alternating-current power is supplied to the stator winding 20B.

Embodiment 4

Figure 42:
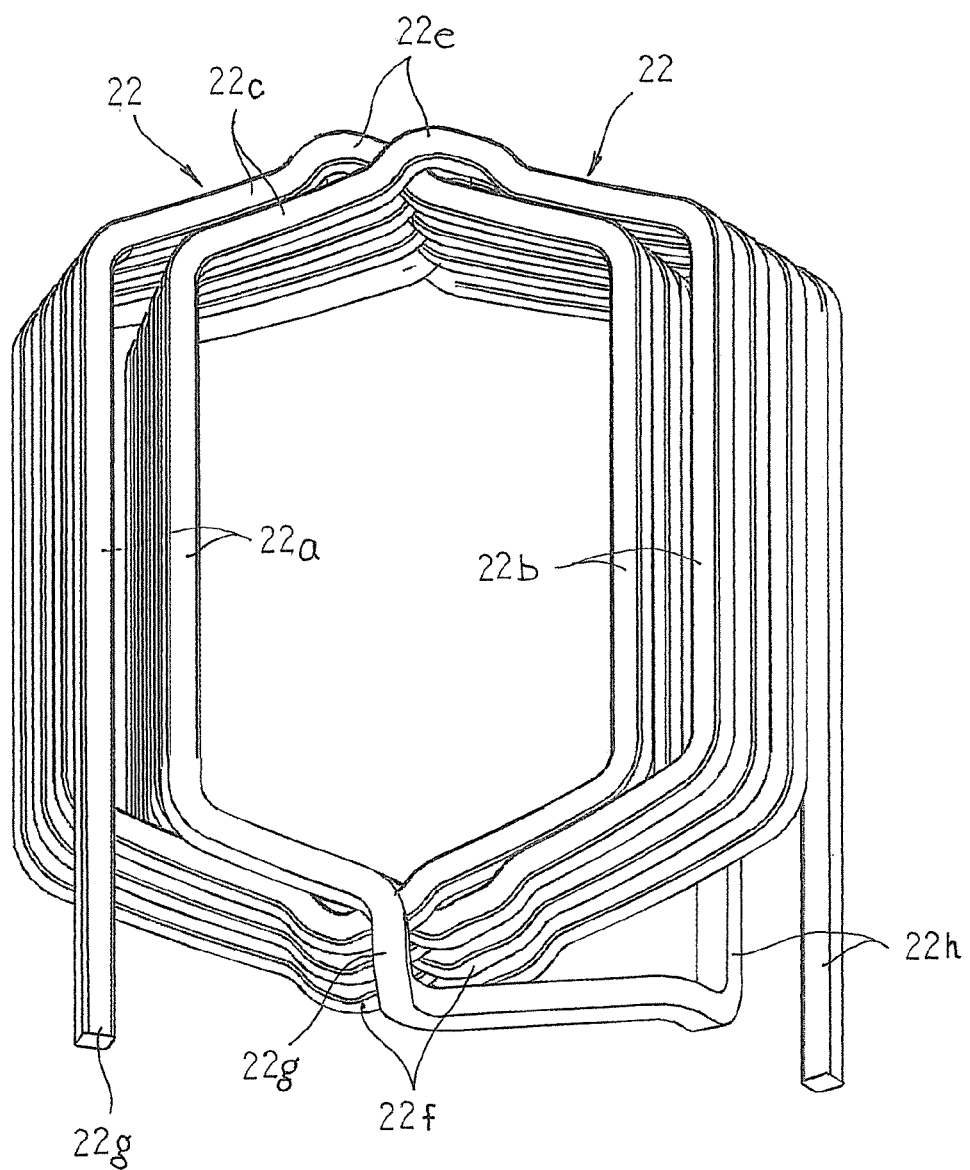
FIG. 42 is an oblique projection that shows a winding body that constitutes a winding assembly in a rotary electric machine according to Embodiment 4 of the present invention.

FIG. 42 is an oblique projection that shows a winding body that constitutes a winding assembly in a rotary electric machine according to Embodiment 4 of the present invention.

In FIG. 42, a continuous winding body 25 is a winding body that is configured by linking a second winding end 22h of a first winding body 22 and a first winding end 22g of a second winding body 22 that are adjacent to each other using a crossover wire outside second coil ends 22d, and is produced using a single conductor wire.

Moreover, Embodiment 4 is configured in a similar or identical manner to that of Embodiment 1 above except that the continuous winding body 25 is used instead of the winding body 22.

According to Embodiment 4, because the continuous winding body 25 is configured so as to be equivalent to integrating an adjacent pair of winding bodies 22, twenty-four continuous winding bodies 25 constitute the winding assembly, facilitating assembly of the winding assembly. The number of welds of the winding ends of the winding assembly is also reduced to half, further simplifying welding processes and insulating treatment processes between the weld portions, and improving productivity.

Moreover, in Embodiment 4 above, the number of slots per phase per pole is two, and adjacent pairs of winding bodies are produced using single conductor wires, but the number of continuous winding bodies that are produced using a single conductor wire need only be greater than or equal to two, and less than or equal to the number of slots per phase per pole. In other words, if the number of slots per phase per pole is three, then three adjacent winding bodies may be produced using a single conductor wire, or only two adjacent winding bodies may be produced using a single conductor wire.

Embodiment 5

Figure 43:
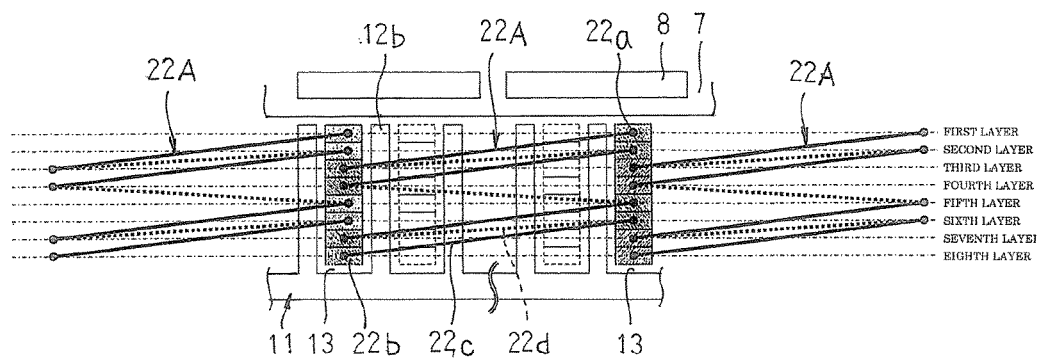
FIG. 43 is a developed projection of a state in which three winding bodies in a rotary electric machine according to Embodiment 5 of the present invention are mounted into identical slot groups of a stator core consecutively in a circumferential direction when viewed from a side near a first axial end.

FIG. 43 is a developed projection of a state in which three winding bodies in a rotary electric machine according to Embodiment 5 of the present invention are mounted into identical slot groups of a stator core consecutively in a circumferential direction when viewed from a side near a first axial end. Moreover, in FIG. 43, coil ends are represented as straight lines for simplicity.

In FIG. 43, winding bodies 22A include: four first rectilinear portions 22a that are housed in a first layer, a second layer, a fifth layer, and a sixth layer of a slot 13 on a first side of six consecutive teeth 12b; four second rectilinear portions 22b that are housed in a third layer, a fourth layer, a seventh layer, and an eighth layer of a slot 13 on a second side of the six consecutive teeth 12b; and first and second coil ends 22c and 22d that alternately link first longitudinal ends to each other and second longitudinal ends to each other between columns of the first and second rectilinear portions 22a and 22b.

Four first coil ends 22c extend outward at a predetermined angle of inclination longitudinally outward relative to the first and second rectilinear portions 22a and 22b from first ends of the first rectilinear portions 22a in the first layer, the second layer, the fifth layer, and the sixth layer in the first slot 13 toward the second rectilinear portions 22b in a second column, are respectively bent approximately at right angles at first top portions 22e (not shown) and displaced by a distance 2d radially outward (toward bottom portions in a slot depth direction), and are subsequently bent approximately at right angles and extend longitudinally inward relative to the first and second rectilinear portions 22a and 22b toward the second rectilinear portions 22b in the second slot 13 at the predetermined angle of inclination, and are connected to first ends of the second rectilinear portion 22b in the third layer, the fourth layer, the seventh layer, and the eighth layer in the second slot 13.

Two second coil ends 22d extend outward at the predetermined angle of inclination longitudinally outward relative to the first and second rectilinear portions 22a and 22b from second ends of the second rectilinear portions 22b in the third layer and the seventh layer in the second slot 13 toward the first rectilinear portions 22a in the first slot 13, are bent approximately at right angles at second top portions 22f (not shown) and displaced by a distance 2d radially inward (toward openings in a slot depth direction), and are subsequently bent approximately at right angles and extend longitudinally inward relative to the first and second rectilinear portions 22a and 22b toward the first rectilinear portions 22a in the first slot 13 at the predetermined angle of inclination, and are connected to second ends of the first rectilinear portions 22a in the second layer and the sixth layer in the first slot 13.

One second coil end 22d extends outward at the predetermined angle of inclination longitudinally outward relative to the first and second rectilinear portions 22a and 22b from a second end of the second rectilinear portion 22b in the fourth layer in the second slot 13 toward the first rectilinear portions 22a in the first slot 13, is bent approximately at right angles at a second top portion 22f (not shown) and displaced by a distance 2d radially outward, and is subsequently bent approximately at right angles and extends longitudinally inward relative to the first and second rectilinear portions 22a and 22b toward the first rectilinear portions 22a in the first slot 13 at the predetermined angle of inclination, and is connected to second end of the first rectilinear portion 22a in the fifth layer in the first slot 13.

In the winding bodies 22A that are configured in this manner, the first and second rectilinear portions 22a and 22b, and the first and second coil ends 22c and 22d, are arranged respectively in a direction of short sides of rectangular cross sections of the conductor wire in a single column such that flat surfaces that are constituted by long sides of the rectangular cross sections of the conductor wire face each other. The first and second rectilinear portions 22a and 22b are displaced radially by an amount of radial displacement at the first and second top portions 22e and 22f of the linking first and second coil ends 22c and 22d. Specifically, the first rectilinear portions 22a are housed in the first layer, the second layer, the fifth layer, and the sixth layer inside the first slot 13, and the second rectilinear portions 22b are housed in the third layer, the fourth layer, the seventh layer, and the eighth layer inside the second slot 13.

The first rectilinear portions 22a of a first winding body 22A and the second rectilinear portions 22b of a second winding body 22A are housed in respective slots 13 so as to line up in a single column in a radial direction (in a slot depth direction). The first rectilinear portions 22a of the first winding body 22A are housed in the first layer, the second layer, the fifth layer, and the sixth layer, and the second rectilinear portions 22b of the second winding body 22A are housed in the third layer, the fourth layer, the seventh layer, and the eighth layer.

Consequently, because the winding bodies 22A are also arranged at a pitch of one slot in a circumferential direction without interfering with each other, similar or identical effects to those in Embodiment 1 above are exhibited.

In Embodiment 5, because a maximum amount of radial displacement (2d) at first and second top portions 22e and 22f is less than a total thickness (4d) of first and second rectilinear portions 22a and 22b in a direction of arrangement inside slots 13, the radial and axial dimensions of the coil end groups are reduced compared to the stator winding that is described in Patent Literature 1, enabling downsizing of the rotary electric machine to be achieved.

When mounting the winding bodies 22A, it is necessary to align two winding bodies 22A in a radial direction such that the conductor wire of the second winding body 22A enters radial gaps between the conductor wire of the first winding body 22A. According to Embodiment 5, because the amount of radial displacement at the first top portions 22e of upper first coil end portions 22c is 2d, alignment of the two winding bodies 22A is facilitated, enabling assembly to be improved. Furthermore, if Embodiment 5 is applied to assembly of large numbers of winding bodies, in which alignment of two winding bodies is difficult, the effects become even more pronounced.

In addition, the amount of radial displacement at the first top portions 22e is 2d, and the shapes of the first coil end portion 22c that joins the first layer to the third layer and the first coil end portion 22c that joins the second layer to the fourth layer, and the shapes of the first coil end portion 22c that joins the fifth layer to the seventh layer and the first coil end portion 22c that joins the sixth layer to the eighth layer, are almost identical, facilitating shaping of the winding bodies. The present applicants have found that similar or identical effects are obtained by making a a factor of the number of turns m in the winding bodies when the amount of radial displacement in the first top portions 22e is approximately a×d.

Embodiment 6

Figure 44:
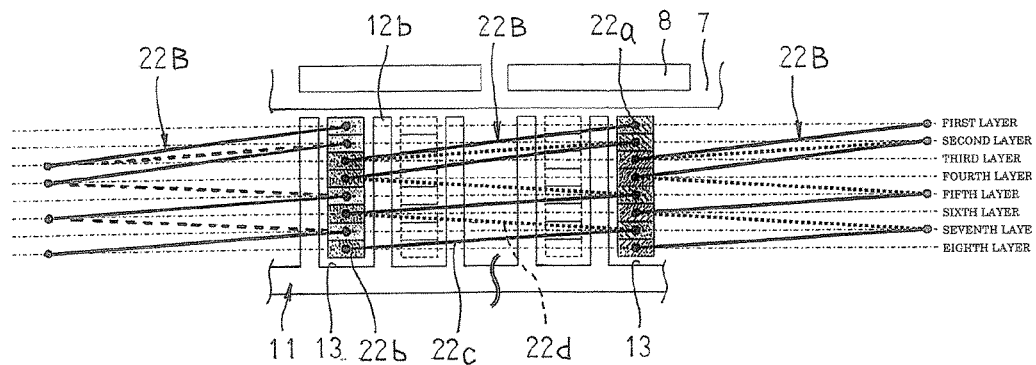
FIG. 44 is a developed projection of a state in which three winding bodies in a rotary electric machine according to Embodiment 6 of the present invention are mounted into identical slot groups of a stator core consecutively in a circumferential direction when viewed from a side near a first axial end.

FIG. 44 is a developed projection of a state in which three winding bodies in a rotary electric machine according to Embodiment 6 of the present invention are mounted into identical slot groups of a stator core consecutively in a circumferential direction when viewed from a side near a first axial end. Moreover, in FIG. 44, coil ends are represented as straight lines for simplicity.

In FIG. 44, winding bodies 22B include: four first rectilinear portions 22a that are housed in a first layer, a second layer, a fifth layer, and a seventh layer of a slot 13 on a first side of six consecutive teeth 12b; four second rectilinear portions 22b that are housed in a third layer, a fourth layer, a sixth layer, and an eighth layer of a slot 13 on a second side of the six consecutive teeth 12b; and first and second coil ends 22c and 22d that alternately link first longitudinal ends to each other and second longitudinal ends to each other between columns of the first and second rectilinear portions 22a and 22b.

Two first coil ends 22c extend outward at a predetermined inclination longitudinally outward relative to the first and second rectilinear portions 22a and 22b from first ends of the first rectilinear portions 22a in the first layer and the second layer in the first slot 13 toward the second rectilinear portions 22b in a second column, are respectively bent approximately at right angles at first top portions 22e (not shown) and displaced by a distance 2d radially outward (toward bottom portions in a slot depth direction), and are subsequently bent approximately at right angles and extend longitudinally inward relative to the first and second rectilinear portions 22a and 22b toward the second rectilinear portions 22b in the second slot 13 at the predetermined inclination, and are connected to first ends of the second rectilinear portion 22b in the third layer and the fourth layer in the second slot 13.

Another two first coil ends 22c extend outward at a predetermined inclination longitudinally outward relative to the first and second rectilinear portions 22a and 22b from first ends of the first rectilinear portions 22a in the fifth layer and the seventh layer in the first slot 13 toward the second rectilinear portions 22b in a second column, are respectively bent approximately at right angles at first top portions 22e (not shown) and displaced by a distance d radially outward (toward bottom portions in a slot depth direction), and are subsequently bent approximately at right angles and extend longitudinally inward relative to the first and second rectilinear portions 22a and 22b toward the second rectilinear portions 22b in the second slot 13 at the predetermined inclination, and are connected to first ends of the second rectilinear portion 22b in the sixth layer and the eighth layer in the second slot 13.

One second coil end 22d extends outward at the predetermined inclination longitudinally outward relative to the first and second rectilinear portions 22a and 22b from a second end of the second rectilinear portion 22b in the third layer in the second slot 13 toward the first rectilinear portions 22a in the first slot 13, is bent approximately at right angles at a second top portion 22f (not shown) and displaced by a distance d radially inward (toward openings in a slot depth direction), and is subsequently bent approximately at right angles and extends longitudinally inward relative to the first and second rectilinear portions 22a and 22b toward the first rectilinear portions 22a in the first slot 13 at the predetermined inclination, and is connected to second end of the first rectilinear portion 22a in the second layer in the first slot 13.

Another two second coil ends 22d extend outward at the predetermined inclination longitudinally outward relative to the first and second rectilinear portions 22a and 22b from second ends of the second rectilinear portions 22b in the fourth layer and the sixth layer in the second slot 13 toward the first rectilinear portions 22a in the first slot 13, are bent approximately at right angles at second top portions 22f (not shown) and displaced by a distance d radially outward, and are subsequently bent approximately at right angles and extend longitudinally inward relative to the first and second rectilinear portions 22a and 22b toward the first rectilinear portions 22a in the first slot 13 at the predetermined inclination, and are connected to second ends of the first rectilinear portions 22a in the fifth layer and the seventh layer in the first slot 13.

In the winding bodies 22B that are configured in this manner, the first and second rectilinear portions 22a and 22b, and the first and second coil ends 22c and 22d, are arranged respectively in a direction of short sides of rectangular cross sections of the conductor wire in a single column such that flat surfaces that are constituted by long sides of the rectangular cross sections of the conductor wire face each other. The first and second rectilinear portions 22a and 22b are displaced radially by an amount of radial displacement at the first and second top portions 22e and 22f of the linking first and second coil ends 22c and 22d. Specifically, the first rectilinear portions 22a are housed in the first layer, the second layer, the fifth layer, and the seventh layer inside the first slot 13, and the second rectilinear portions 22b are housed in the third layer, the fourth layer, the sixth layer, and the eighth layer inside the second slot 13.

The first rectilinear portions 22a of a first winding body 22B and the second rectilinear portions 22b of a second winding body 22B are housed in respective slots 13 so as to line up in a single column in a radial direction (in a slot depth direction). The first rectilinear portions 22a of the first winding body 22B are housed in the first layer, the second layer, the fifth layer, and the seventh layer, and the second rectilinear portions 22b of the second winding body 22B are housed in the third layer, the fourth layer, the sixth layer, and the eighth layer.

Consequently, because the winding bodies 22B are also arranged at a pitch of one slot in a circumferential direction without interfering with each other, similar or identical effects to those in Embodiment 1 above are exhibited.

In Embodiment 6, because a maximum amount of radial displacement (2d) at first and second top portions 22e and 22f is less than a total thickness (4d) of first and second rectilinear portions 22a and 22b in a direction of arrangement inside slots 13, the radial and axial dimensions of the coil end groups are reduced compared to the stator winding that is described in Patent Literature 1, enabling downsizing of the rotary electric machine to be achieved.

Moreover, in each of the above embodiments, an inner-rotor electric motor has been explained, but similar or identical effects are also exhibited if the present invention is applied to an outer-rotor electric motor.

In each of the above embodiments, cases in which the present application has been applied to an electric motor have been explained, but similar or identical effects are also exhibited if the present application is applied to a generator.

Each of the above embodiments has been explained using a stator, but the armature is not limited to a stator, and similar or identical effects are exhibited also if the present application is applied to a rotor where the rotor is a wound rotor.

In each of the above embodiments, an 8-pole 48-slot rotary electric machine has been explained, but it goes without saying that the number of poles and the number of slots are not limited to eight poles and forty-eight slots. Furthermore, the slots are formed at a ratio of two slots per phase per pole, but the number of slots per phase per pole is not limited to two, and may be one, or may be three or greater.

In each of the above embodiments, winding bodies are produced using conductor wires that are coated with insulation, but an insulation coating treatment may be applied to winding bodies that are produced using conductor wires that are not coated with insulation.

In each of the above embodiments, the number of slots is formed at a ratio of two slots per phase per pole, and the pitch between the first and second rectilinear portions of the winding bodies is set to an angular pitch of six slots to configure the stator winding into a full-pitch winding, but the pitch between the first and second rectilinear portions of the winding bodies is not limited to an angular pitch of six slots. For example, if the pitch between the first and second rectilinear portions of the winding bodies is set to an angular pitch of five slots, the stator winding can be configured into a short-pitch winding, and if the pitch between the first and second rectilinear portions of the winding bodies is set to an angular pitch of seven slots, the stator winding can be configured into a long-pitch winding. In addition, if winding bodies in which the pitch between the first and second rectilinear portions is set to an angular pitch of five slots and winding bodies in which the pitch between the first and second rectilinear portions is set to an angular pitch of seven slots are arranged so as to alternate circumferentially, a stator winding can be configured in which short-pitch windings and long-pitch windings are combined.

The invention claimed is:

1. A rotary electric machine comprising an armature that is formed by mounting an armature core to an annular armature winding, wherein:

said armature winding includes winding bodies each being formed by winding a jointless, continuous conductor wire that is coated with insulation for m turns into a helical shape such that end portions of rectilinear portions are linked by coil ends, where m is a natural number that is greater than or equal to two, said winding bodies located in pairs of slots of said armature core that are separated by a predetermined number of slots and being arranged in a circumferential direction at a pitch of one slot; and each winding body including rectilinear portions on a first side at one end in the circumferential direction and rectilinear portions at a second side at an end opposite to the one end in the circumferential direction, rectilinear portions positioned on the first side in the circumferential direction of a first winding body and rectilinear portions positioned on the second side in the circumferential direction of a second winding body are housed so as to line up radially in each of said slots of said armature core such that greater than or equal to one and less than or equal to (m−1) rectilinear portions of said first winding body arranged between rectilinear portions of said second winding body.

2. The rotary electric machine according to claim 1, wherein a number of slots per phase per pole is greater than or equal to two, and greater than or equal to two and less than or equal to said number of slots per phase per pole of said winding bodies that are arranged consecutively in a circumferential direction are each produced using a single conductor wire.

3. The rotary electric machine according to claim 1, wherein heights of said top portions of said coil ends of said winding bodies from an axial end surface of said armature core reduce gradually toward a radially inner side.

4. The rotary electric machine according to claim 1, wherein said coil ends of said winding bodies are positioned nearer to bottom portions of said slots of said armature core than to opening ends of said slots.

5. The rotary electric machine according to claim 1, wherein said coil ends of said winding bodies are positioned nearer to openings of said slots of said armature core than to bottom portions of said slots.

6. The rotary electric machine according to claim 1, wherein a cross section of said conductor wire is rectangular.

7. The rotary electric machine according to claim 6, wherein said cross section of said conductor wire is an oblong rectangle, and said conductor wire is housed inside said slots so as to line up radially such that a long side of said oblong rectangular cross section is oriented in a circumferential direction.

* * * * *